United States Patent
Mansell

(10) Patent No.: US 11,567,763 B2
(45) Date of Patent: Jan. 31, 2023

(54) WIDENING ARITHMETIC IN A DATA PROCESSING APPARATUS

(71) Applicant: ARM LIMITED, Cambridge (GB)

(72) Inventor: David Hennah Mansell, Cambridge (GB)

(73) Assignee: Arm Limited, Cambridge (GB)

( * ) Notice: Subject to any disclaimer, the term of this patent is extended or adjusted under 35 U.S.C. 154(b) by 290 days.

(21) Appl. No.: 16/487,251

(22) PCT Filed: Jan. 26, 2018

(86) PCT No.: PCT/GB2018/050229
§ 371 (c)(1),
(2) Date: Aug. 20, 2019

(87) PCT Pub. No.: WO2018/154269
PCT Pub. Date: Aug. 30, 2018

(65) Prior Publication Data
US 2020/0218538 A1     Jul. 9, 2020

(30) Foreign Application Priority Data
Feb. 23, 2017   (GB) .................................... 1702918

(51) Int. Cl.
*G06F 9/30*     (2018.01)
*G06F 17/16*    (2006.01)

(52) U.S. Cl.
CPC ...... *G06F 9/30014* (2013.01); *G06F 9/30036* (2013.01); *G06F 9/30109* (2013.01); *G06F 17/16* (2013.01)

(58) Field of Classification Search
None
See application file for complete search history.

(56) References Cited

U.S. PATENT DOCUMENTS

| | | |
|---|---|---|
| 7,890,566 B1 | 2/2011 | Zbiciak |
| 2005/0132165 A1 | 6/2005 | Ford et al. |
| (Continued) | | |

FOREIGN PATENT DOCUMENTS

| | | |
|---|---|---|
| JP | H09-288661 | 11/1997 |
| JP | 2005-174293 | 6/2005 |
| (Continued) | | |

OTHER PUBLICATIONS

Office Action for EP Application No. 18702543.2 dated Sep. 7, 2020, 5 pages.
(Continued)

*Primary Examiner* — John M Lindlof
(74) *Attorney, Agent, or Firm* — Nixon & Vanderhye P.C.

(57) ABSTRACT

A data processing apparatus, a method of operating a data processing apparatus, a non-transitory computer readable storage medium, and an instruction are provided. The instruction specifies a first source register and a second source register. In response to the instruction control signals are generated, causing processing circuitry to perform a dot product operation. For this operation at least a first data element and a second data element are extracted from each of the first source register and the second source register, such that then at least first data element pairs and second data element pairs are multiplied together. The dot product operation is performed independently in each of multiple intra-register lanes across each of the first source register and the second source register. A widening operation with a large density of operations per instruction is thus provided.

22 Claims, 22 Drawing Sheets

(56) References Cited

U.S. PATENT DOCUMENTS

| | | | |
|---|---|---|---|
| 2006/0149804 A1 | 7/2006 | Luick et al. | |
| 2007/0239968 A1* | 10/2007 | Moyer | G06F 9/30101 712/221 |
| 2008/0071851 A1 | 3/2008 | Zohar et al. | |
| 2010/0274990 A1 | 10/2010 | Wilder et al. | |
| 2011/0153707 A1* | 6/2011 | Ginzburg | G06F 9/30036 708/523 |
| 2013/0305020 A1 | 11/2013 | Valentine et al. | |
| 2014/0032881 A1* | 1/2014 | Zohar | G06F 9/3001 712/207 |
| 2014/0095842 A1* | 4/2014 | Caprioli | G06F 9/30014 712/222 |
| 2015/0227367 A1 | 8/2015 | Eyole-Monono et al. | |
| 2017/0046153 A1* | 2/2017 | Mahurin | G06F 17/16 |

FOREIGN PATENT DOCUMENTS

| | | |
|---|---|---|
| JP | 2008-77663 | 4/2008 |
| JP | 2011-096254 | 5/2011 |
| JP | 2014-509764 | 4/2014 |
| JP | 2016-535360 | 11/2016 |
| JP | 2017-505491 | 2/2017 |
| KR | 10-2010-0075494 | 7/2010 |
| WO | 2009/035774 | 3/2009 |
| WO | 2013/101018 | 7/2013 |

OTHER PUBLICATIONS

Combined Search and Examination Report for Application No. GB 1702918.2 dated Aug. 22, 2017, 9 pages.
Examination Report for Application No. GB 1702918.2 dated Mar. 5, 2019, 2 pages.
International Search Report and Written Opinion of the ISA for PCT/GB2018/050229 dated Apr. 3, 2018, 14 pages.
Office Action for EP Application No. 18702543.2 dated Sep. 21, 2021, 7 pages.
Office Action for JP Application No. 2019-543984 dated Dec. 10, 2021 and English translation, 7 pages.
Office Action for IN Application No. 201947036686 dated Jan. 18, 2022, 7 pages.
Office Action for KR Application No. 10-2019-7026457 dated Apr. 28, 2022, 8 pages.
Office Action for JP Application No. 2019-543984 dated May 25, 2022 and English translation, 8 pages.

* cited by examiner

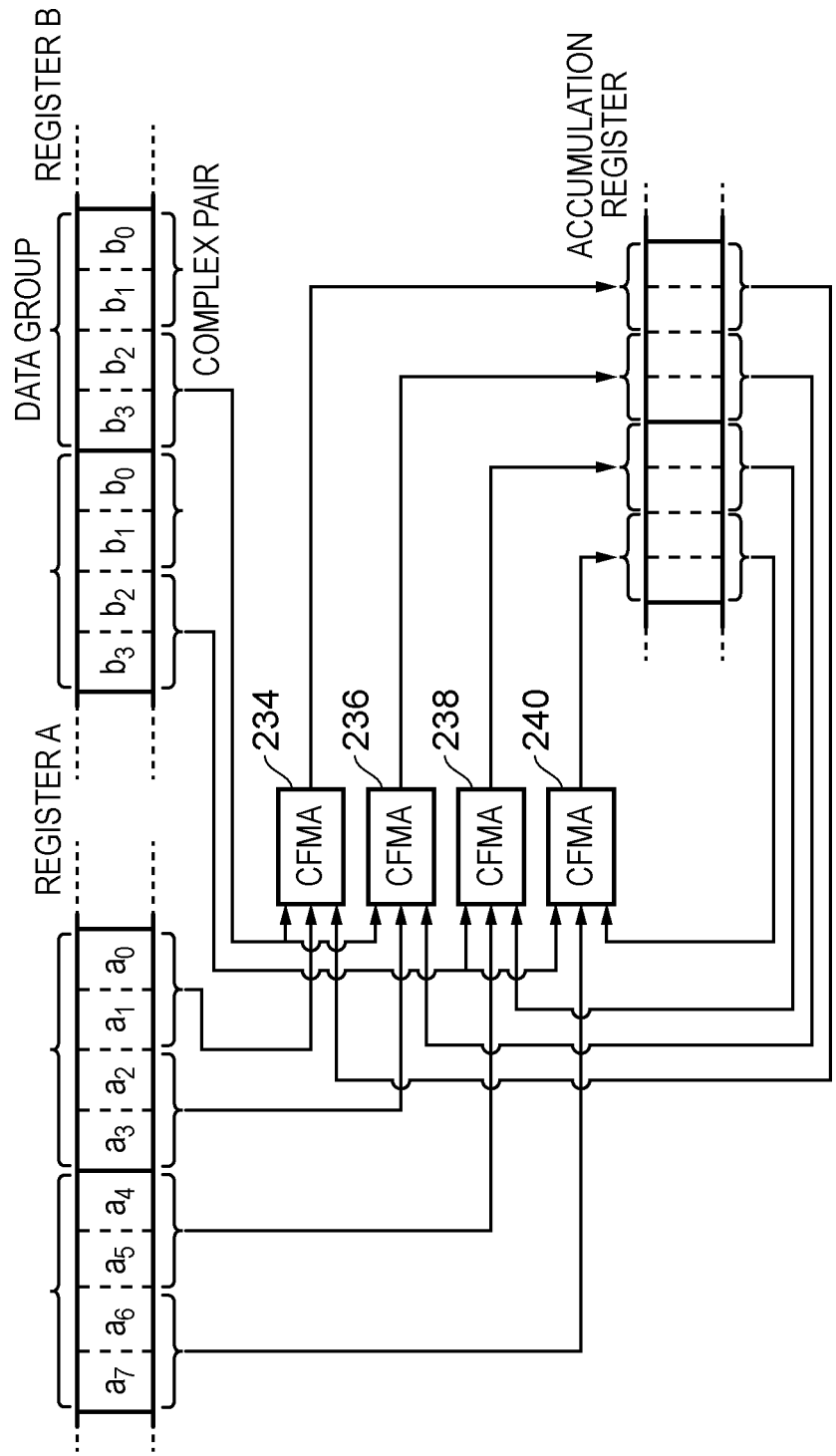
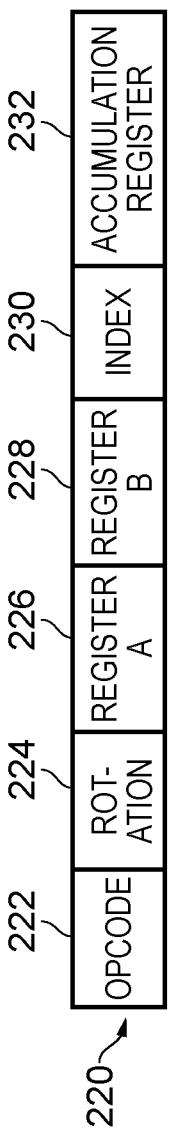
FIG. 7B
FIG. 7A

WIDENING ARITHMETIC IN A DATA PROCESSING APPARATUS

This application is the U.S. national phase of International Application No. PCT/GB2018/050229 filed Jan. 26, 2018 which designated the U.S. and claims priority to GB 1702918.2 filed Feb. 23, 2017, the entire contents of each of which are hereby incorporated by reference.

The present disclosure is concerned with data processing. In particular it is concerned with a data processing apparatus which performs arithmetic operations.

A data processing apparatus may be required to perform arithmetic operations. These arithmetic operations can for example include multiply operations which can find applicability in a variety of contexts. One factor which must be accommodated when providing such a data processing apparatus is the inherent "widening" which takes place when some number formats (e.g. fixed point numbers, such as integers) are multiplied together, if other approaches such as truncation or saturation (which limit the accuracy of the calculation) are not to be resorted to. Hence despite the fact that the input operands to a multiplication operation could be relatively compact, the result may be "wider" in the sense that it requires more bits to be stored than each of the input operands. To take a contemporary example, where 8-bit integers are viewed as very compact (thus saving storage and memory bandwidth cost), once multiplied together these integers produce a 16-bit result, and if more than one such result is accumulated then an even wider accumulation register is needed to avoid overflow. In this example, where the next readily available register size in a contemporary apparatus is 32 bits wide, it will be appreciated that considerable "widening" for this arithmetic operation is required to be accommodated. In addition however, although such widening operations are possible, a further factor in their implementation is that throughput tends to be a function of the accumulator width. For example in a implementation using registers having a 128-bit width, such that each register can then accommodate sixteen 8-bit values, widening multiply accumulate operations can only target four 32-bit accumulators provided by one register (since only four 32-bit accumulators can be accommodated in the register width) and this becomes a limiting factor on performance (e.g. eight operations per cycle–4 multiplies and 4 accumulates).

At least one example described herein provides a data processing apparatus comprising: register storage circuitry having a plurality of registers to store data elements; decoder circuitry responsive to a data processing instruction to generate control signals, the data processing instruction specifying in the plurality of registers: a first source register and a second source register; and processing circuitry responsive to the control signals to perform a dot product operation comprising: extracting at least a first data element and a second data element from each of the first source register and the second source register; performing multiply operations of multiplying together at least first data element pairs and second data element pairs; and summing results of the multiply operations, wherein each of the first source register and the second source register comprises a plurality of intra-register lanes and the processing circuitry is responsive to the control signals to perform the dot product operation independently in each intra-register lane.

At least one example described herein provides a method of operating a data processing apparatus comprising: generating control signals in response to a data processing instruction, the data processing instruction specifying in a plurality of registers: a first source register and a second source register; and performing a dot product operation in response to the control signals comprising: extracting at least a first data element and a second data element from each of the first source register and the second source register; performing multiply operations of multiplying together at least first data element pairs and second data element pairs; and summing results of the multiply operations, wherein each of the first source register and the second source register comprises a plurality of intra-register lanes and the dot product operation is performed independently in each intra-register lane.

At least one example described herein provides a computer-readable storage medium storing in a non-transient fashion a program comprising at least one data processing instruction which when executed by a data processing apparatus causes: generation of control signals in response to the data processing instruction, the data processing instruction specifying a first source register and a second source register in register storage circuitry of the data processing apparatus; and performance of a dot product operation in response to the control signals comprising: extracting at least a first data element and a second data element from each of the first source register and the second source register; performing multiply operations of multiplying together at least first data element pairs and second data element pairs; and summing of results of the multiply operations, wherein each of the first source register and the second source register comprises a plurality of intra-register lanes and the dot product operation is performed independently in each intra-register lane.

At least one example described herein provides a data processing apparatus comprising: means for storing data elements in a plurality of registers; means for decoding a data processing instruction to generate control signals, the data processing instruction specifying in the plurality of registers: a first source register and a second source register; and means for performing a dot product operation in response to the control signals comprising: extracting at least a first data element and a second data element from each of the first source register and the second source register; performing multiply operations of multiplying together at least first data element pairs and second data element pairs; and summing results of the multiply operations, wherein each of the first source register and the second source register comprises a plurality of intra-register lanes and the dot product and accumulate operation is performed independently in each intra-register lane.

The present invention will be described further, by way of example only, with reference to embodiments thereof as illustrated in the accompanying drawings, in which:

FIG. 1 schematically illustrates a data processing apparatus which can embody various examples of the present techniques;

FIG. 2 schematically illustrates the use of a data preparation instruction in one embodiment;

FIG. 3 schematically illustrates a variant on the embodiment of FIG. 2;

FIG. 4A schematically illustrates an example data processing instruction and FIG. 4B shows the implementation of the execution of that data processing instruction in one embodiment;

FIGS. 5A and 5B schematically illustrate two ways in which the routing of data elements to operational units may be provided in some embodiments;

FIGS. 6A and 6B schematically illustrate two further examples of the data processing instruction discussed with reference to FIGS. 4A and 4B and their execution;

FIG. 7A schematically illustrates an example data processing instruction and FIG. 7B shows the implementation of the execution of that data processing instruction in one embodiment;

FIG. 8 shows a sequence of steps which are taken according to the method of one embodiment;

FIG. 9A schematically illustrates the execution of a data processing instruction according to one embodiment and FIG. 9B shows two examples of such an instruction;

FIG. 10 schematically illustrates some variations in embodiments of the execution of the data processing instructions of FIG. 9B;

FIG. 11 schematically illustrates a more complex example with two 128-bit source registers for a "dot product" data processing instruction in one embodiment;

Figure 15A:
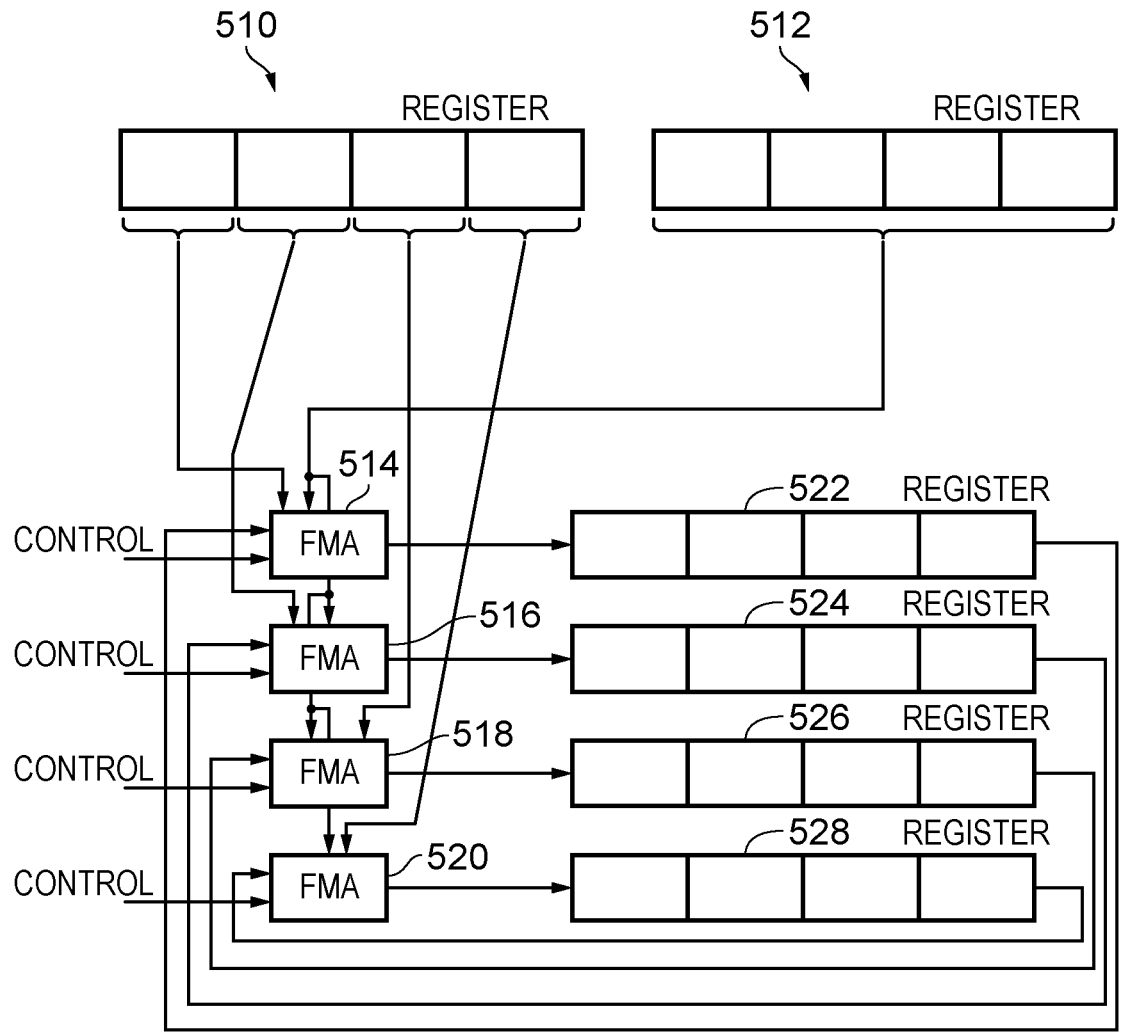
Figure 15B:
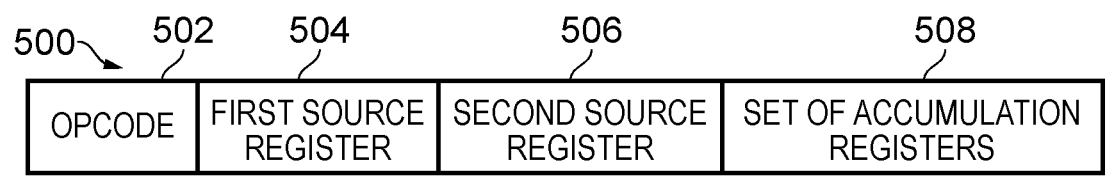
Figure 16:
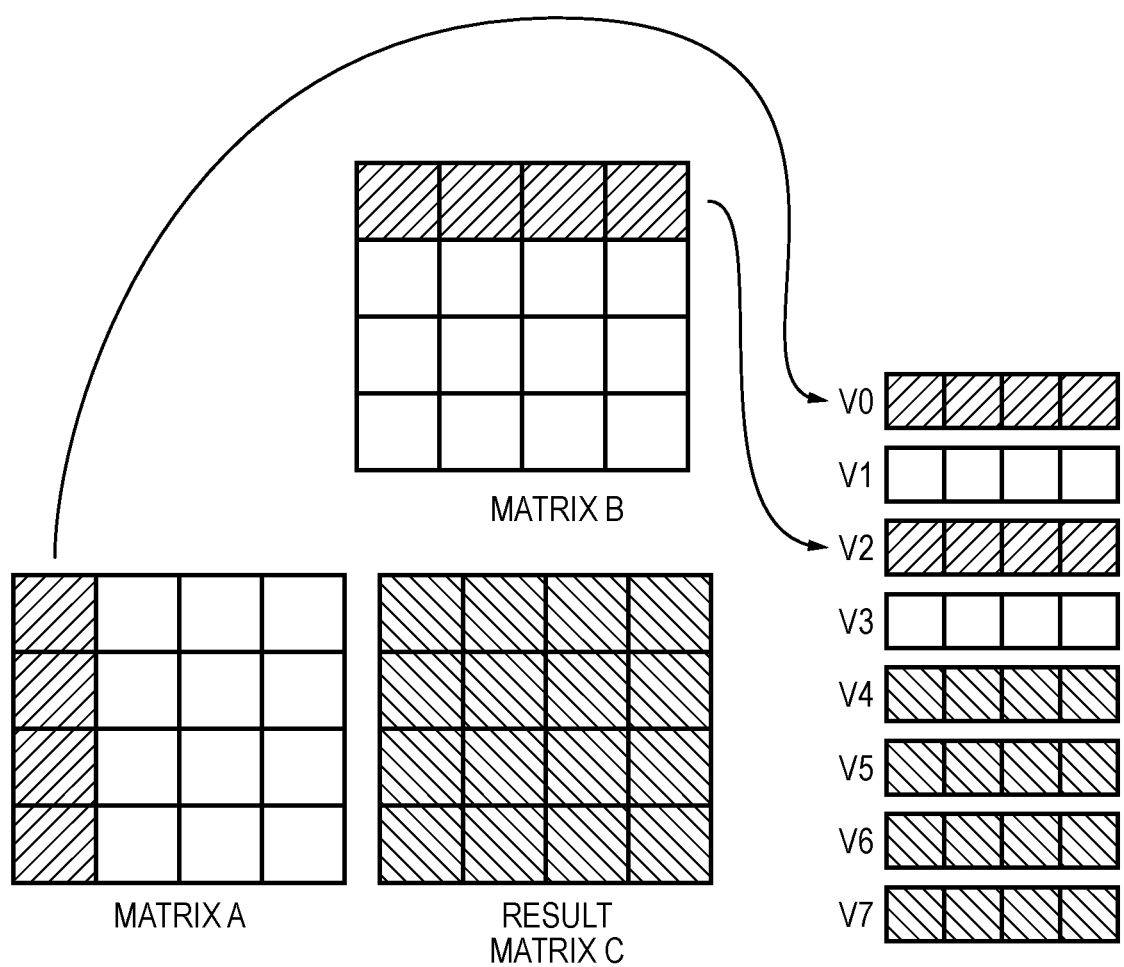
Figure 17:
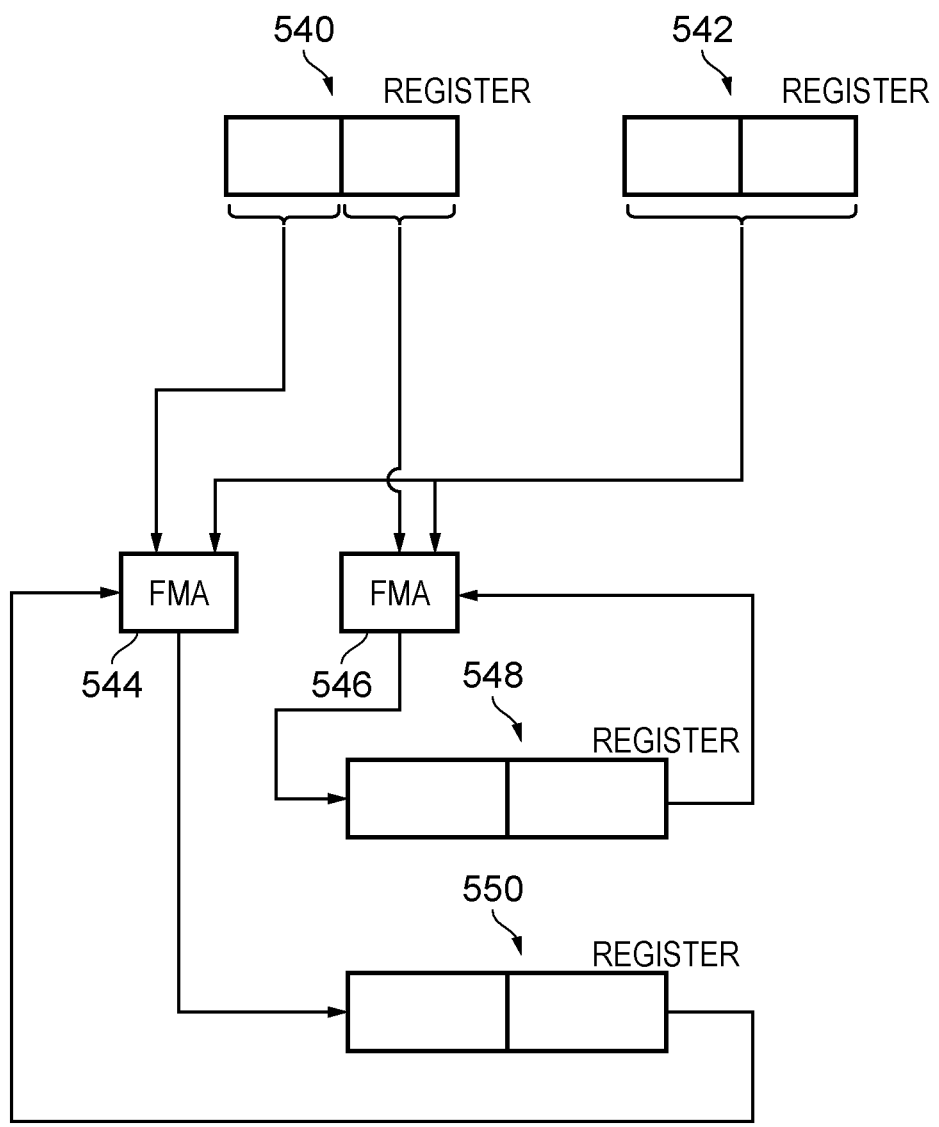
Figure 18:
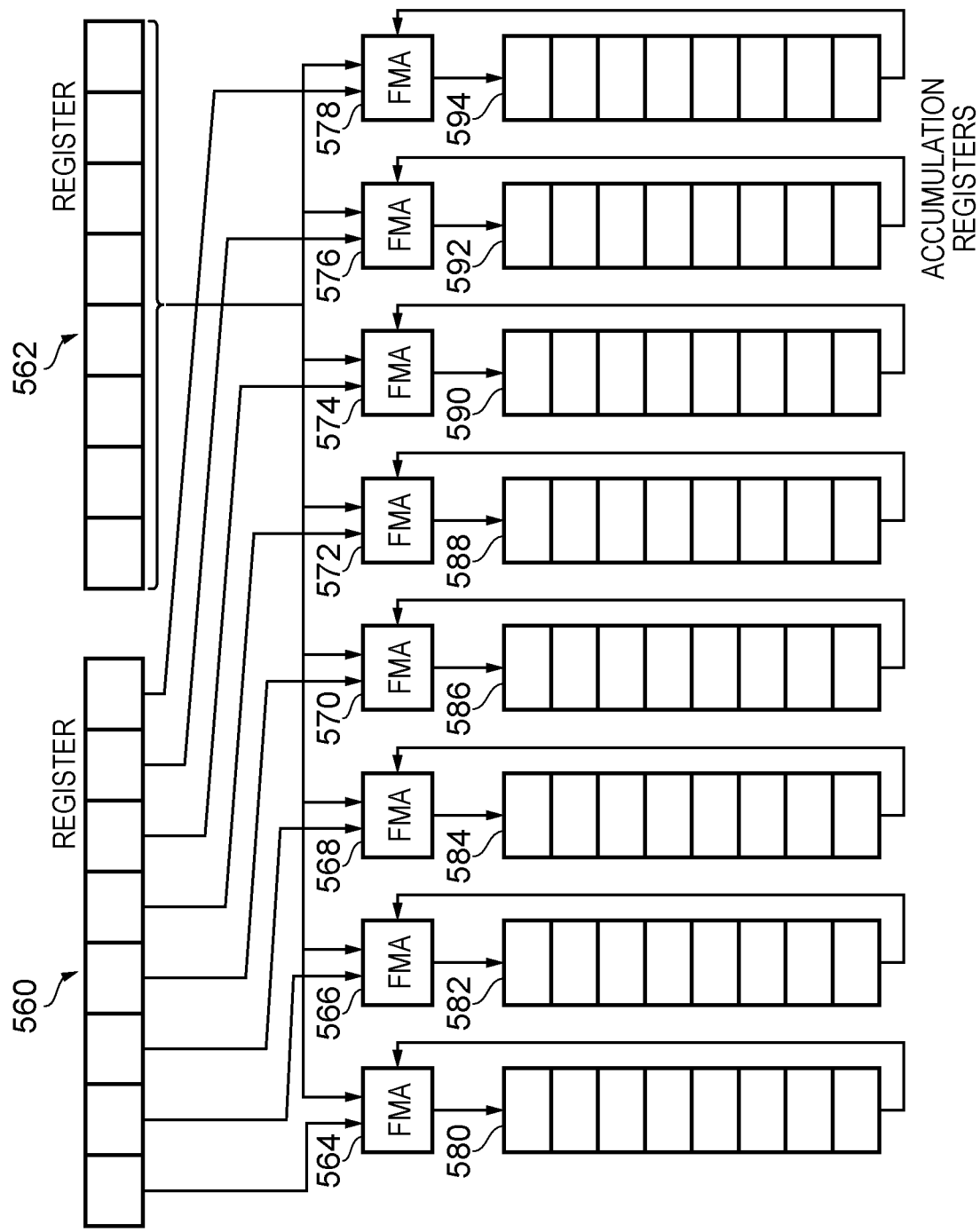
Figure 19:
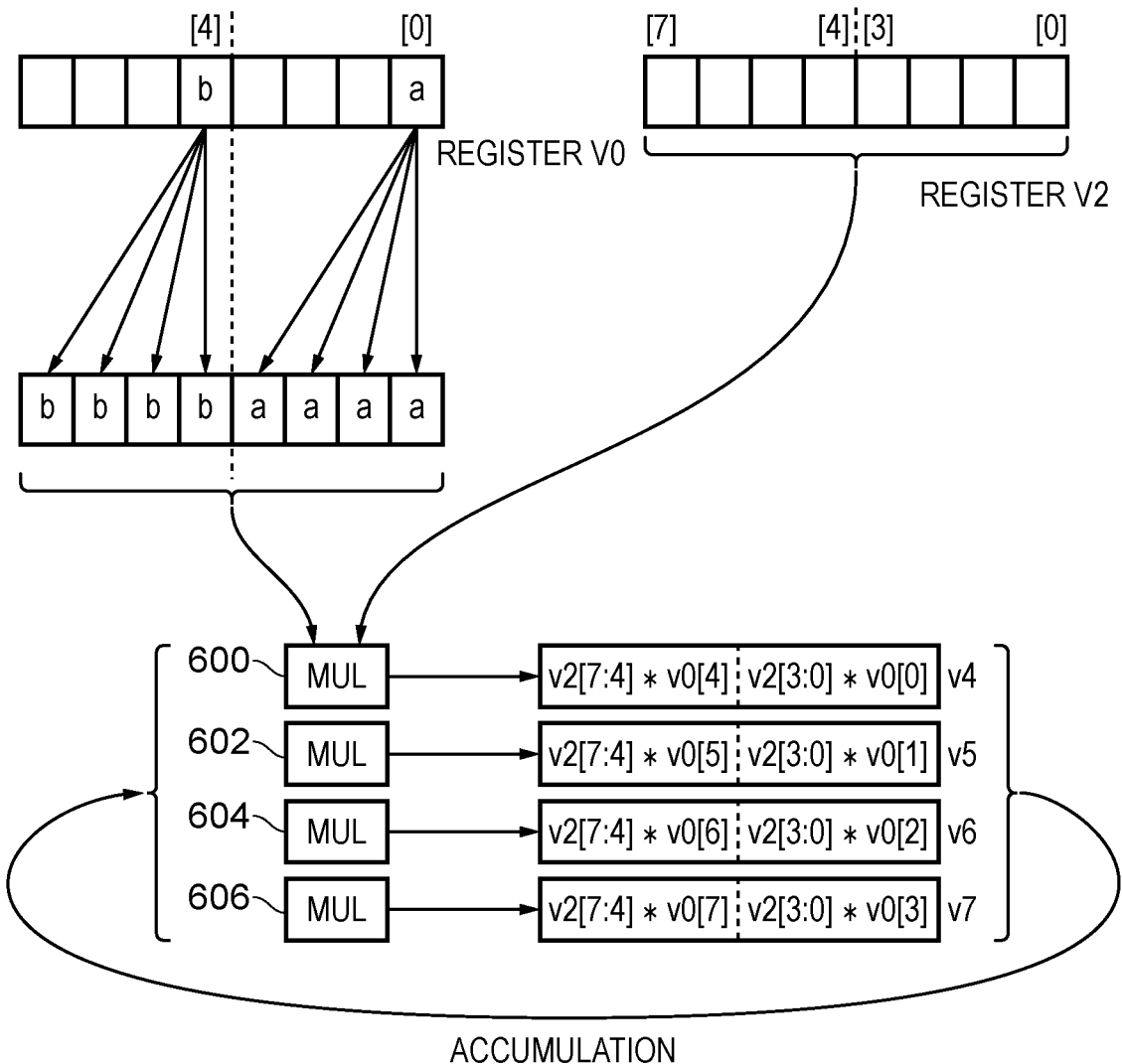
Figure 20:
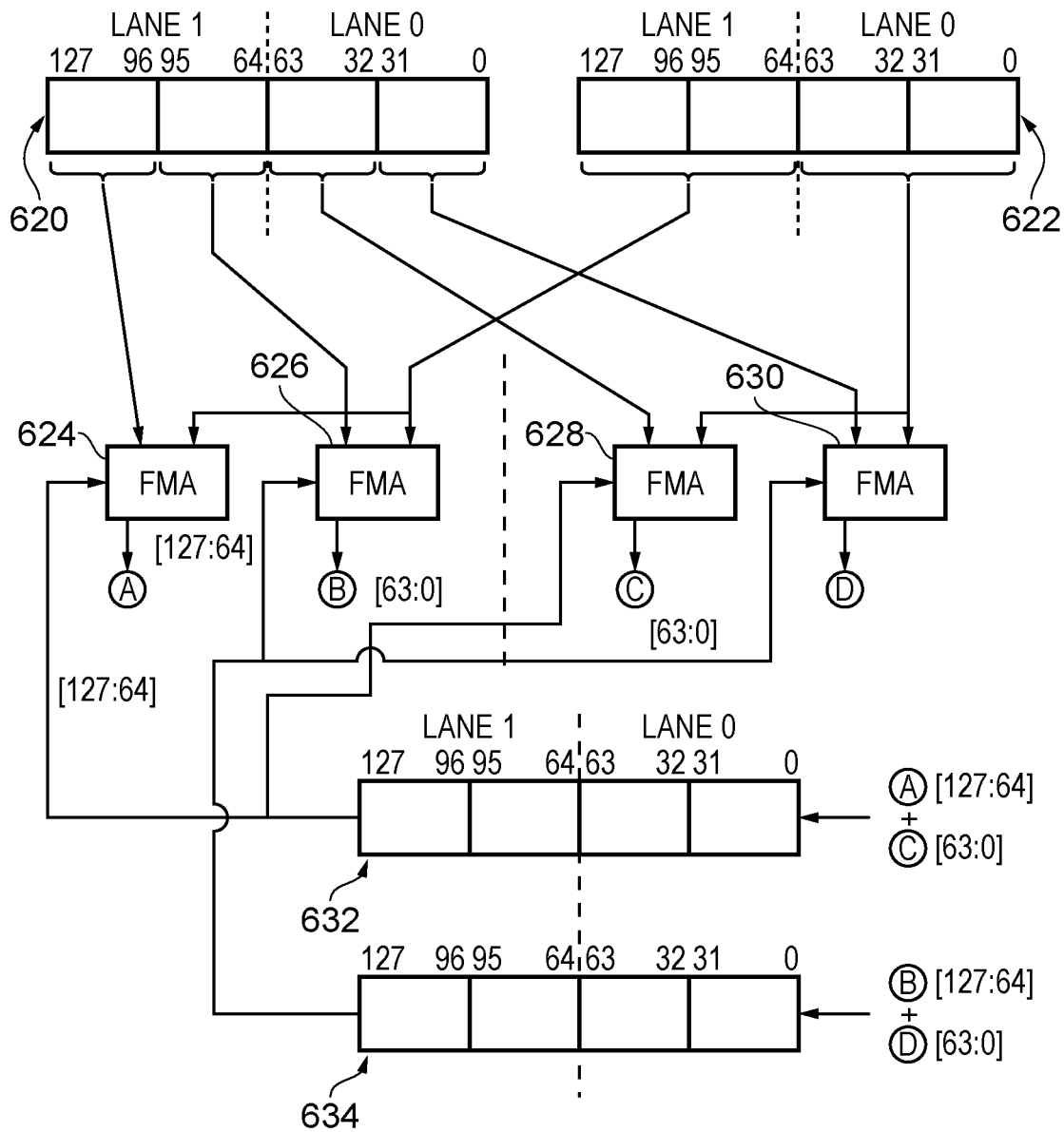
Figure 21:
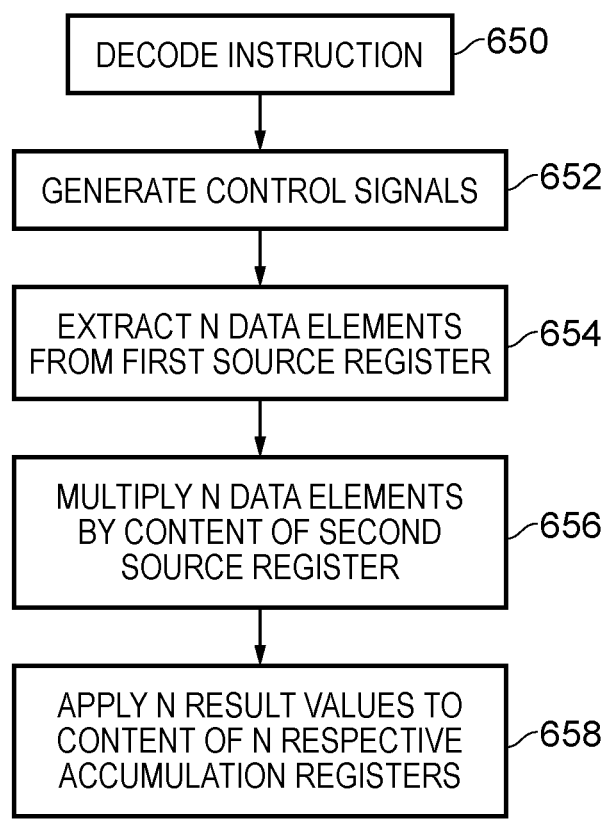
Figure 22:
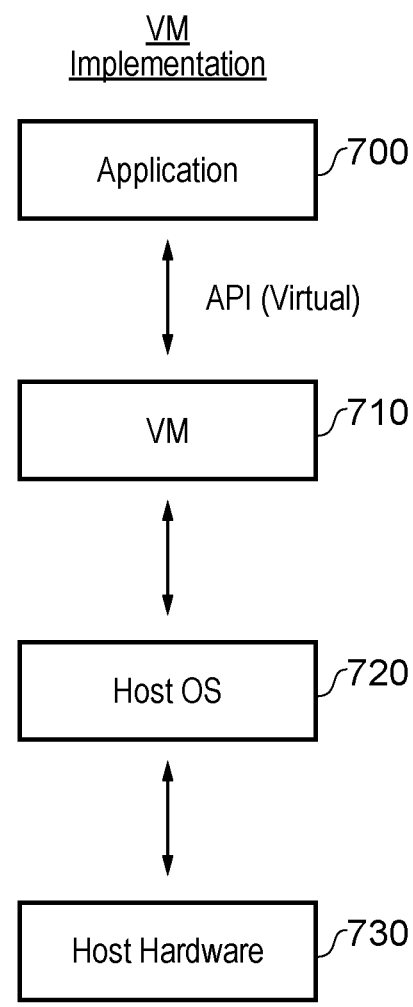

FIG. 15A schematically illustrates the execution of a data processing instruction provided by some embodiments and FIG. 15B shows a corresponding example instruction;

FIG. 16 shows an example visualisation of the embodiment of FIG. 15A, in the form of a simple matrix multiply operation;

FIG. 17 shows a simpler variant of the examples shown in FIG. 15A, where only two data elements are derived from each of the first and second source registers;

FIG. 18 shows another variant of the example shown in FIG. 15A, where more data elements are extracted from each of the source registers;

FIG. 19 shows an example embodiment of the execution of a data processing instruction, giving more detail of some specific multiplication operations which are performed;

FIG. 20 shows an example embodiment of the execution of a data processing instruction, where the content of two source registers are treated as containing data elements in two independent lanes;

FIG. 21 shows a sequence of steps which are taken according to the method of one embodiment; and FIG. 22 shows a virtual machine implementation in accordance with one embodiment.

At least one example embodiment described herein provides a data processing apparatus comprising: register storage circuitry having a plurality of registers to store data elements; decoder circuitry responsive to a data processing instruction to generate control signals, the data processing instruction specifying in the plurality of registers: a first source register and a second source register; and processing circuitry responsive to the control signals to perform a dot product operation comprising: extracting at least a first data element and a second data element from each of the first source register and the second source register; performing multiply operations of multiplying together at least first data element pairs and second data element pairs; and summing results of the multiply operations, wherein each of the first source register and the second source register comprises a plurality of intra-register lanes and the processing circuitry is responsive to the control signals to perform the dot product operation independently in each intra-register lane.

The instruction provided, and the corresponding circuitry provided in the data processing apparatus to support it, therefore enables at least two data elements to be extracted from each of the first source register and the second source register, so that pair-wise multiplication operations on the data elements extracted from each source register can be performed. In other words in an example where two data elements are extracted from each of the first and second source registers, the pair-wise multiplication operations multiply together the first data elements extracted from each of the first and second source registers in a first multiplication operation and also separately multiply together the second data elements extracted from each of the first and second source registers in a second multiplication operation. The results of these multiplication operations are then added together. Moreover, this dot product operation is replicated (in action, not in content) multiple times across each of the first and second source registers, the content of which is thus treated as being presented in multiple independent lanes.

This approach to the provision of dot product calculating capability thus provides a new form of widening operation, where instead of performing a multiply operation on just one data element taken from each of the first and second source registers, at least two data elements taken from each of the first and second source registers, thus treating each as a vector to be multiplied with one another, such that a dot product operation is performed across this pair of vectors. Notably this approach does not suffer from the same throughput constraint as outlined above, since the improved throughput is facilitated at the level of the multiplication component rather than at the level of the accumulation. Moreover the dot product operation is performed independently in each of plural intra-register lanes, thus providing an efficient and compact mechanism for parallel processing of multiple pairs of values stored in just two registers.

This lane-based approach also limits the complexity of the adder required. Taking an example of an instruction which accumulates such pairs across the entire 128-bit (or wider) register into a single 32-bit accumulator, this would present significant constructional difficulties to build efficiently, because a large number of individual results (16 in this 128-bit case, but even more if the registers were wider) would have to be summed together as part of the instruction. However, by confining the addition to operate within lanes, this complexity is limited and expansion to wider register widths is simplified (because wider registers would simply comprise more lanes and the lanes operate independently). Note that this capability is still useful to the programmer, because she can arrange for independent computations to occur within each lane, or can simply add values across all the lanes later (perhaps after several accumulations have been performed) if a single result is desired.

The present techniques recognise that such an instruction, and the hardware to support its execution, may find particular applicability in applications where many relatively "small" values need parallel processing, and the present techniques thus provide a great "density" of operations in response to a single instruction. For example in the context of registers having a 128-bit width, where sixteen 8-bit values can be held in each, and using a 32-bit lane width (i.e. four 8-bit data elements are extracted for each lane and the 128-bit width is handled as four lanes), this means that 32 operations are carried out in response to a single instruction (16 multiplies and 16 adds), which is 3-4 times denser than typical contemporary instructions. Indeed it is to be noted that the present techniques are in no way limited to such a width and when implemented in even longer vectors this would increase the effective operation count accordingly.

Further, the present techniques recognise that although some number formats, such as floating point numbers, don't strictly speaking have the above-discussed widening issue when a multiply operation is carried out (i.e. when the output value of the operation requires more bits for its representation than its operands), their arithmetic is more complex to implement in hardware and hence it is common for an implementation to only support, say, 16-bit numbers. Taking this example, if a multiply result cannot properly be described in these 16 bits then precision is lost (or leads to overflow or underflow in extreme cases). Whilst floating point numbers could be defined with fewer than 16 bits, they would be of little practical value for arithmetic due to this effect. Conversely, the present techniques also recognise that for number in a fixed point format, of which integers are a special case, there are essentially three approaches to the issue. Taking the example of multiplying 8-bit unsigned integers together: a) the answer could be truncated to the least significant 8 bits (i.e. overflowing if the result was >255); b) the answer could saturate (so any answer >255 gets changed to 255, which can suit some particular applications); or c) the answer can be allowed to "widen", thus keeping the entire result. Widening is evidently the most accurate approach and indeed in some applications, for example when performing repeated accumulations, it is the only option that produces useful results. Generally therefore, the use of integers is preferable to reduce the storage and memory bandwidth cost. The hardware is also simpler, and the present techniques supports its efficient implementation.

The data processing instruction may further specify in the plurality of registers an output register, and wherein summing the results of the multiply operations further comprises applying a result of the summing to the output register.

Indeed the output register may be an accumulator register and the dot product operation may be a dot product and accumulate operation which further comprises loading an accumulator value from the accumulator register and summing the results of the multiply operations with the accumulator value.

In some embodiments in which a dot product and accumulate operation is carried out this may be instigated by means of a pair of instructions, namely a first instruction for the dot product operation, followed by a second instruction for the accumulation. Accordingly, as well as being responsive to the data processing instruction as described above, in some embodiment the decoder circuitry is responsive to a further data processing instruction to generate further control signals, the data processing instruction specifying in the plurality of registers the output register and an accumulator register, and the processing circuitry is responsive to the further control signals to perform an accumulate operation comprising: loading an accumulator value from the accumulator register and a summation value from the output register; summing the accumulator value and the summation value; and storing a result of the summing in the accumulator register.

Depending on the nature of the data elements to be extracted from the first and second source registers and the calculations to be performed, the widths of these registers may vary, but in some embodiments the widths of the first source register, of the second source register, and of the output register are equal. In the same manner the width of the accumulator register may vary, and in some embodiments the widths of the first source register, of the second source register, of the output register, and of the accumulator register are equal.

Depending on the particular configuration, the relative size of the data elements extracted from the first source register or the second source register may vary with respect to the register width. This applies both in terms of the individual data elements themselves and in terms of the combined size of all data elements extracted from the first source register or the second source register for the dot product operation. Accordingly, in some embodiments, a width of the first source register is equal to a combined size of all data elements extracted from the first source register in the dot product operation. Equally, in some embodiments, a width of the second source register is equal to a combined size of all data elements extracted from the second source register in the dot product operation. Note in particular that the final step of the dot product operation comprises summing the results of all of the multiply operations which form part of that dot product operation. Hence for example in those embodiments where the combined size of all data elements extracted from the first source register is equal to the width of the first source register, this therefore essentially means that data elements are extracted across the full width of the first source register and that the set of data elements thus extracted is added together in the addition.

It should be appreciated that the present techniques are in no way limited to a particular number of data elements which are extracted from each of the first and second source registers. Whilst for the purposes of clarity of discussion examples above have been discussed in which two data elements are extracted from each register, in many embodiments there may well be more than two data elements extracted from each. For example in some embodiments the dot product operation further comprises extracting at least a third data element and a fourth data element from each of the first source register and the second source register, performing further multiply operations of multiplying together at least third data element pairs and fourth data element pairs, and summing results of the further multiply operations with the results of the multiply operations.

Depending on the particular requirements of the given implementation the combined size of the data elements extracted from each intra-register lane of each source register may vary, but a compact and efficient implementation may result from embodiments in which a size of each intra-register lane is equal to a combined size of all data elements extracted from each intra-register lane of the first source register in the dot product operation. Equally, size of each intra-register lane may be equal to a combined size of all data elements extracted from each intra-register lane of the second source register in the dot product operation.

It is further to be noted that the present techniques also contemplate embodiments in which there are one or more data element manipulations which may be applied to the data elements selected from a given source register, before those data elements are subjected to the dot product operation. In one example this data element manipulation may take the form of reusing a portion of the content of the given source register to provide the multiple data elements extracted from that source register. Hence in some embodiments the data processing instruction specifies a repeated intra-register lane and a selected source register of the first source register and the second source register, and the processing circuitry is responsive to the control signals to reuse content of the repeated intra-register lane for all lanes of the selected source register. In other words in such examples the content of one lane may be copied to provide the content of multiple lanes for the purpose of the dot product operation.

As will be evident from the above discussion, a great range of permutations of register widths, intra-register lane widths, and extracted data element widths are contemplated.

In some specific embodiments, for example, the plurality of intra-register lanes have a 32-bit width and the extracting comprises extracting four 8-bit data elements from each intra-register lane of the first source register and the second source register. In some other specific embodiments, for example, the plurality of intra-register lanes have a 64-bit width and the extracting comprises extracting four 16-bit data elements from each intra-register lane of the first source register and the second source register.

The nature of the data values held in the first and second source registers may vary, and as a consequence the nature of the multiply and adding carried out. In some embodiments the multiply operations and adding are integer operations. In some embodiments the values held in the first source register and in the second source register are signed values. In some embodiments the values held in the first source register and in the second source register are unsigned values. In some embodiments the multiply operations and adding are floating-point operations. In some embodiments the plurality of intra-register lanes have a 32-bit width and the extracting comprises extracting two 16-bit floating point data elements from each intra-register lane of the first source register and the second source register. In some embodiments the plurality of intra-register lanes have a 64-bit width and the extracting comprises extracting two 32-bit floating point data elements from each intra-register lane of the first source register and the second source register.

At least one example embodiment described herein provides a method of operating a data processing apparatus comprising: generating control signals in response to a data processing instruction, the data processing instruction specifying in a plurality of registers: a first source register and a second source register; and performing a dot product operation in response to the control signals comprising: extracting at least a first data element and a second data element from each of the first source register and the second source register; performing multiply operations of multiplying together at least first data element pairs and second data element pairs; and summing results of the multiply operations, wherein each of the first source register and the second source register comprises a plurality of intra-register lanes and the dot product operation is performed independently in each intra-register lane.

At least one example embodiment described herein provides a computer-readable storage medium storing in a non-transient fashion a program comprising at least one data processing instruction which when executed by a data processing apparatus causes: generation of control signals in response to the data processing instruction, the data processing instruction specifying a first source register and a second source register in register storage circuitry of the data processing apparatus; and performance of a dot product operation in response to the control signals comprising: extracting at least a first data element and a second data element from each of the first source register and the second source register; performing multiply operations of multiplying together at least first data element pairs and second data element pairs; and summing of results of the multiply operations, wherein each of the first source register and the second source register comprises a plurality of intra-register lanes and the dot product operation is performed independently in each intra-register lane.

At least one example embodiment described herein provides a data processing apparatus comprising: means for storing data elements in a plurality of registers; means for decoding a data processing instruction to generate control signals, the data processing instruction specifying in the plurality of registers: a first source register and a second source register; and means for performing a dot product operation in response to the control signals comprising: extracting at least a first data element and a second data element from each of the first source register and the second source register; performing multiply operations of multiplying together at least first data element pairs and second data element pairs; and summing results of the multiply operations, wherein each of the first source register and the second source register comprises a plurality of intra-register lanes and the dot product and accumulate operation is performed independently in each intra-register lane.

At least one example embodiment described herein provides a virtual machine provided by a computer program executing upon a data processing apparatus, said virtual machine providing an instruction execution environment corresponding to one of the above-mentioned data processing apparatuses.

Some particular embodiments will now be described with reference to the figures.

Figure 1:
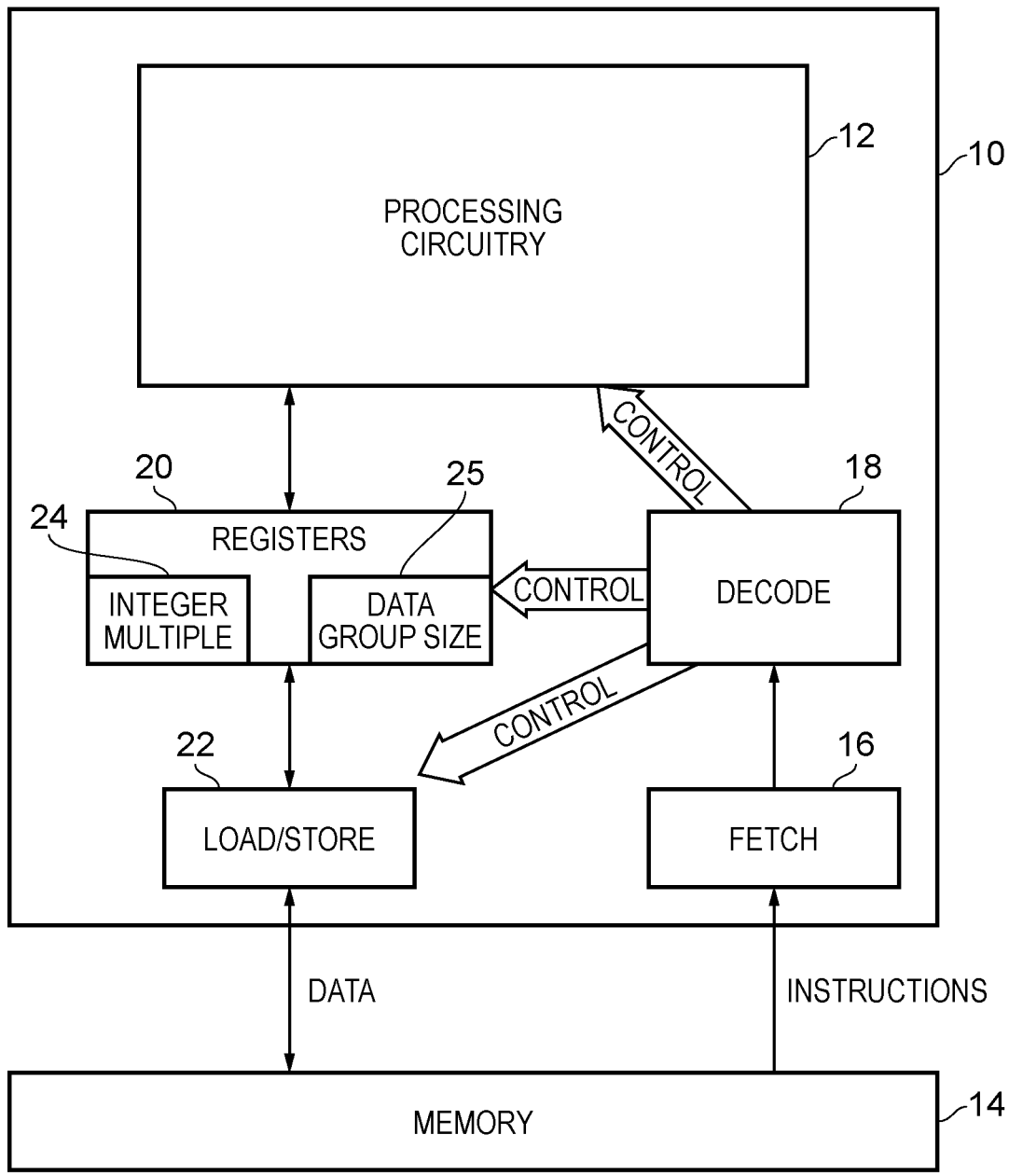

FIG. 1 schematically illustrates a data processing apparatus which may embody various examples of the present techniques. The data processing apparatus comprises processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Further instructions retrieved by the fetch circuitry 16 are passed to the decode circuitry 18, which generates control signals which are arranged to control various aspects of the configuration and operation of the processing circuitry 12. A set of registers 20 and a load/store unit 22 are also shown. One of ordinary skill in the art will be familiar with the general configuration which FIG. 1 represents and further detail description thereof is dispensed herewith merely for the purposes of brevity. The registers 20, in the embodiments illustrated in FIG. 1, can comprise storage for one or both of an integer multiple 24 and a data group 25 size, the use of which will be described in more detail below with reference to some specific embodiments. Data required by the processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

Figure 2:
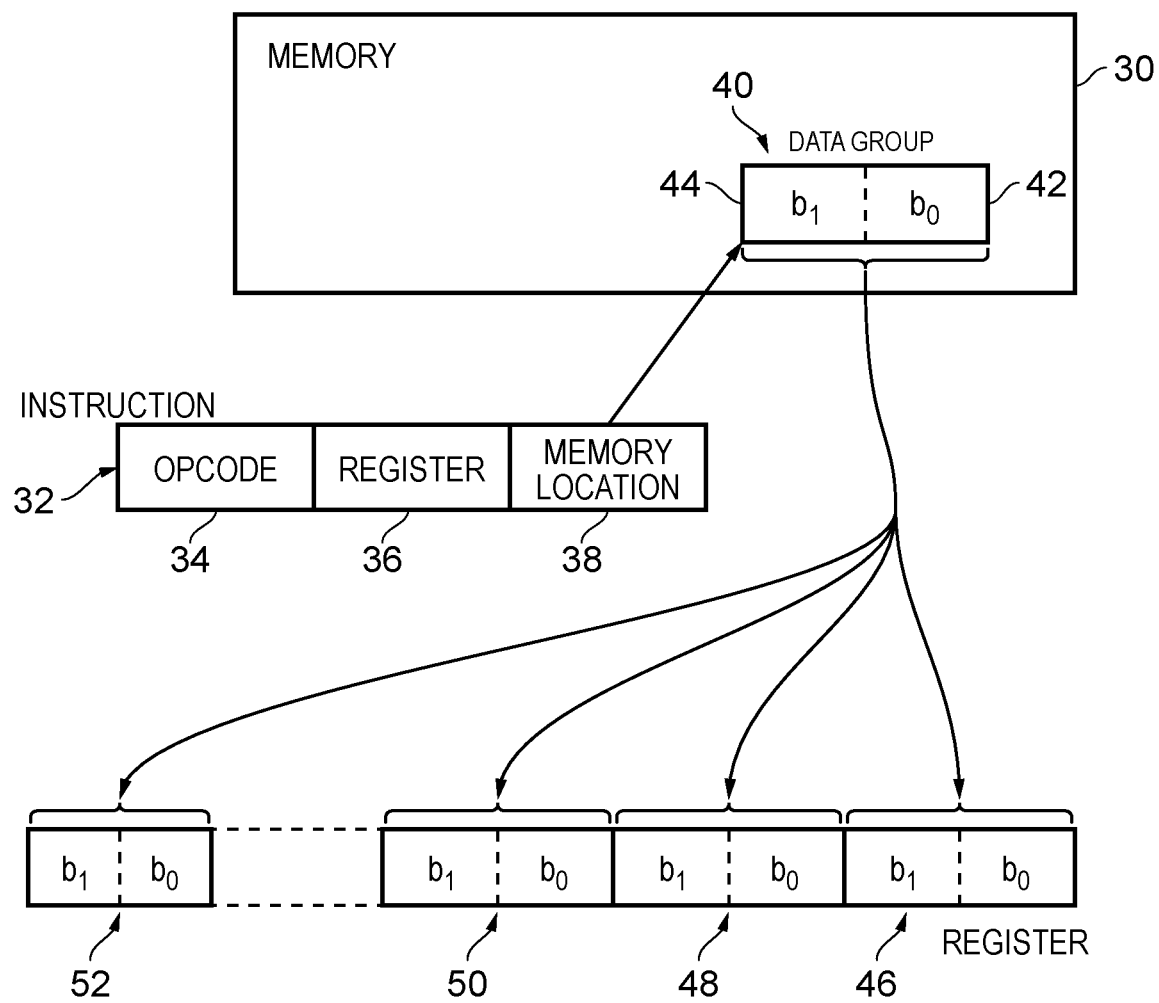

FIG. 2 schematically illustrates the use of a data preparation instruction 32. The data preparation instruction 32 comprises an opcode portion 34 (defining it as a data preparation instruction), a register specifier 36, and a memory location specifier 38. Execution of this instruction by the data processing apparatus of this embodiment causes a data group 40 to be identified which is stored in a memory 30 (referenced by the specified memory location and, for example extending over more than one address, depending on the defined data group size) and comprises (in this illustrated embodiment) two data elements b0 and b1 (labelled 42 and 44 in the figure). Further, execution of the instruction causes this data group 40 to be copied into the specified register and moreover to be replicated across the width of that register, as shown in FIG. 2 by the repeating data groups 46, 48, 50, and 52, each made up of the data elements b0 and b1.

Figure 3:
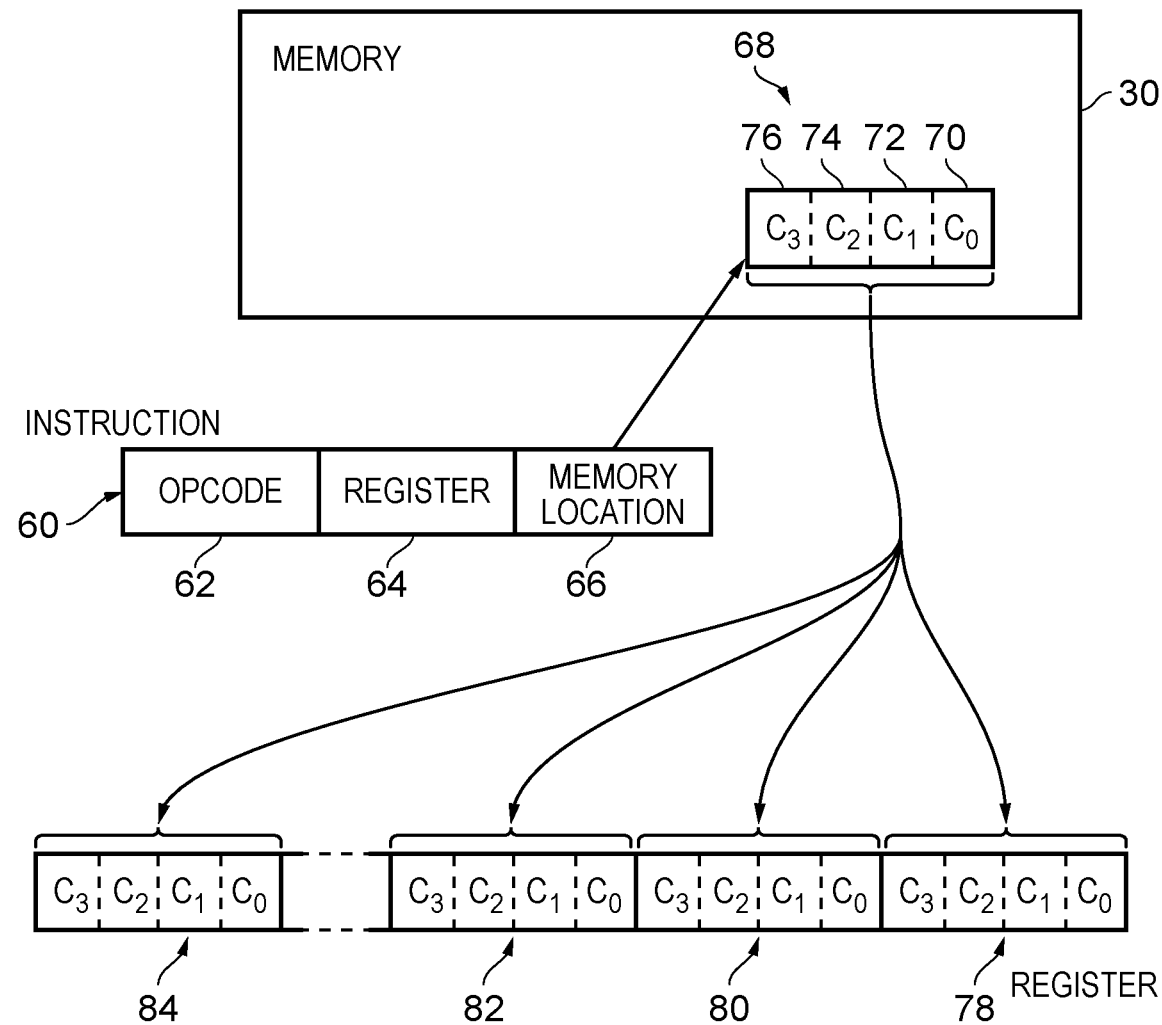

FIG. 3 schematically illustrates a variant on the embodiment of FIG. 2, demonstrating that such a data preparation instruction may cause different sizes of data groups to be copied and replicated. In the illustrated example of FIG. 3 the instruction 60 has the same structure, i.e. comprising an opcode 62, a register specifier 64, and a specified memory location 66. Execution of the instruction 60 causes the memory location 66 to be accessed and the data group 68 stored there (i.e. for example beginning at that memory location and extended over a predetermined number of data elements) comprises data elements c0, c1, c2, and c3 (labelled 70, 72, 74, and 76 in the figure). This data group 68 is copied and replicated across the width of the target register, and shown by the repeating copies of this data group 78, 80, 82, and 84. Note, referring back to FIG. 1, that the data group size can be predefined by a value held in a dedicated storage location 25 in the registers 20. Finally, it should be appreciated that the examples of FIGS. 2 and 3 are not limited to any particular data group widths or multiples of replication. However, to discuss just one example which is useful in a contemporary context, the replication could take place over a width of 128 bits. In the context of the Scalable Vector Extensions (SVE) provided by ARM® Limited of Cambridge, UK, this width corresponds to the SVE vector granule size. In the context of the ASMID instructions also provided by ARM® Limited, this corresponds to the size of an ASIMD register. Accordingly the present techniques enable to loading and replicating of the following groups types: two 64-bit data elements; four 32-bit data elements; eight 16-bit data elements; or sixteen 8-bit data elements.

Figure 4A:
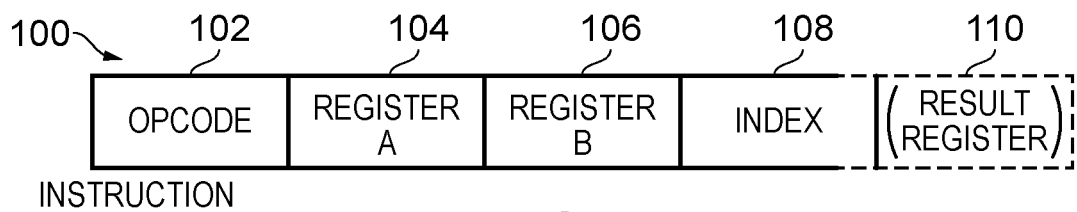
Figure 4B:
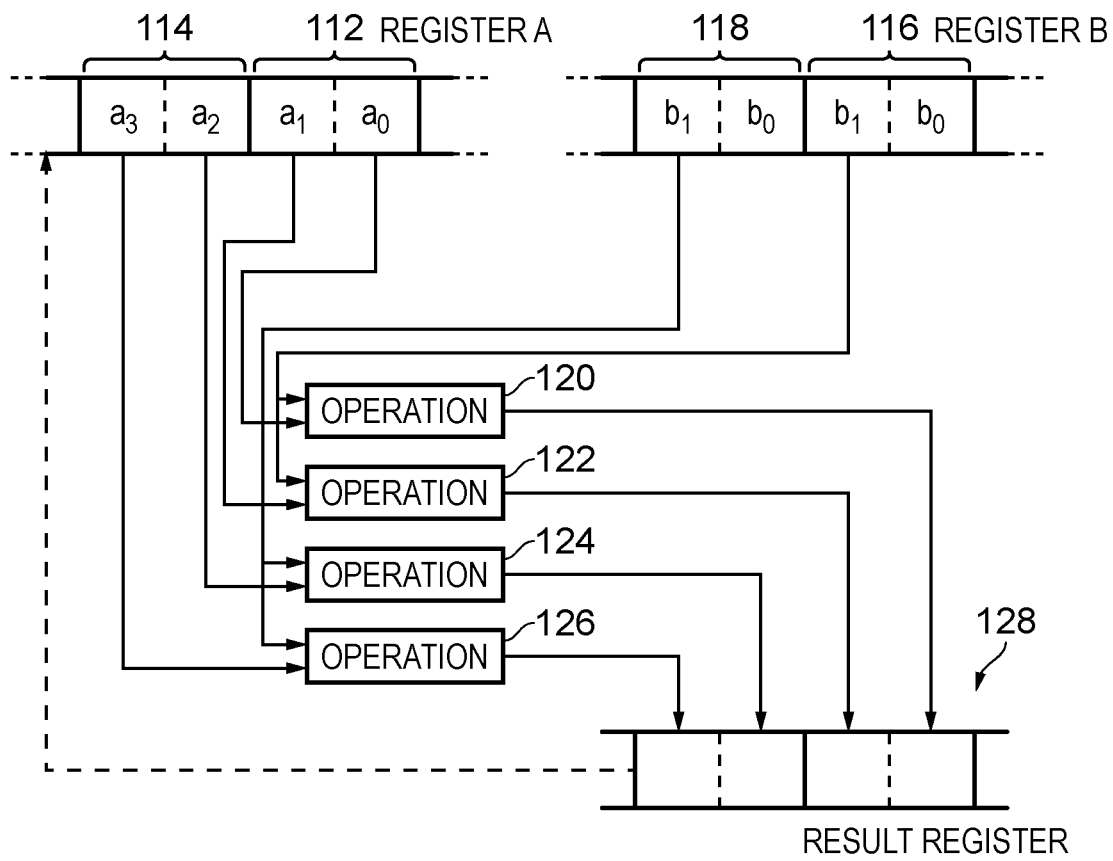

FIG. 4A schematically illustrates an example data processing instruction and FIG. 4B shows the implementation of the execution of that data processing instruction in one embodiment. This data processing instruction comprises an opcode 102, a first register specifier 104, a second register specifier 106, an index specifier 108, and as an optional variant, a result register specifier 110. FIG. 4B illustrates that the execution of this instruction causes data groups in register A and register B to be accessed, wherein all data elements in each data group in register A, i.e. in this example data elements a0 and a1 in the first data group 112 and data elements a2 and a3 in the second data group 114 to be accessed, whilst in register B only a selected data element is accessed in each of the data groups 116 and 118, namely the data element b1. Thus accessed these data elements are passed to the operational circuitry of the processing circuitry, represented in FIG. 4B by the operation units 120, 122, 124, and 126 which apply a data processing operation with respect to the data elements taken from register B and the data groups taken from register A. As mentioned above the instruction 100 may specify a result register (by means of the identifier 110) and the results of these operations are written to the respective data elements of a result register 128. In fact, in some embodiments the result register 128 and register A may be one and the same register, allowing for example multiply-accumulate operations to be performed with respect to the content of that register (as is schematically shown in FIG. 4 by means of the dashed arrow). Note also that the registers shown in FIG. 4B are intentionally illustrated as potentially extending (on both sides) beyond the portion accessed by the example instruction. This correspond to the fact that in some implementations (such as the above-mentioned Scalable Vector Extensions (SVE)) the vector size may be unspecified. For example taking FIG. 4B as depicting the operation of the instruction for a group of, say, two 64-bit data elements (b0 and b1) in an SVE example the vector size for the destination could be anything from 128 bits up to 2048 bits (in increments of 128 bits).

Figure 5A:
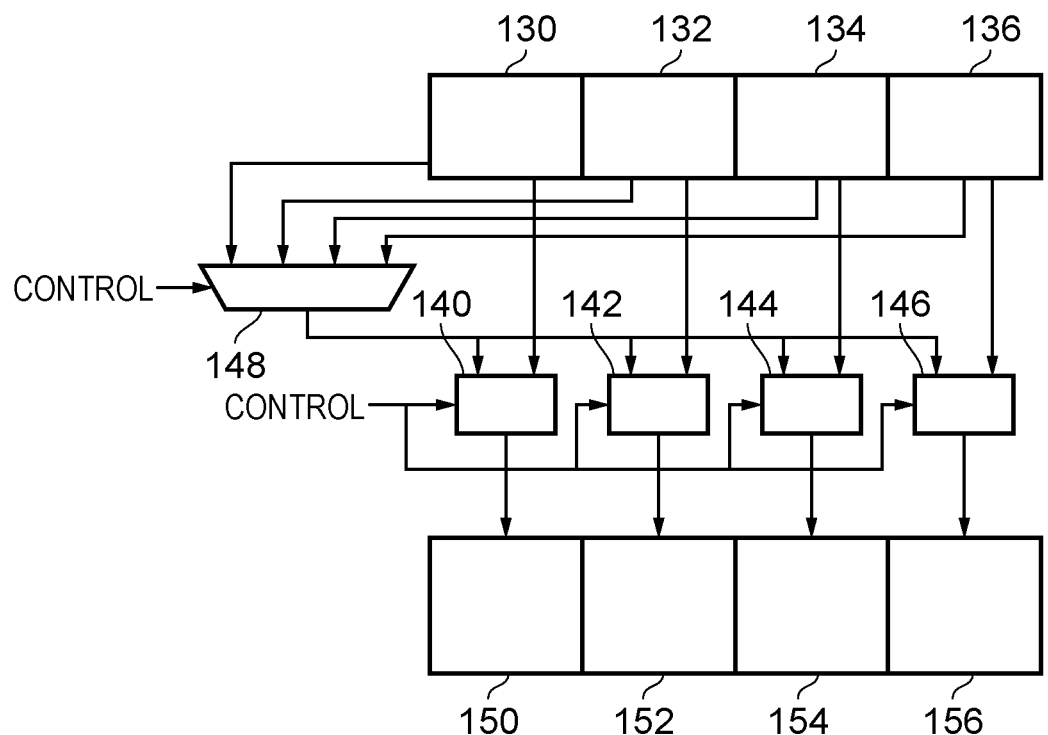
Figure 5B:
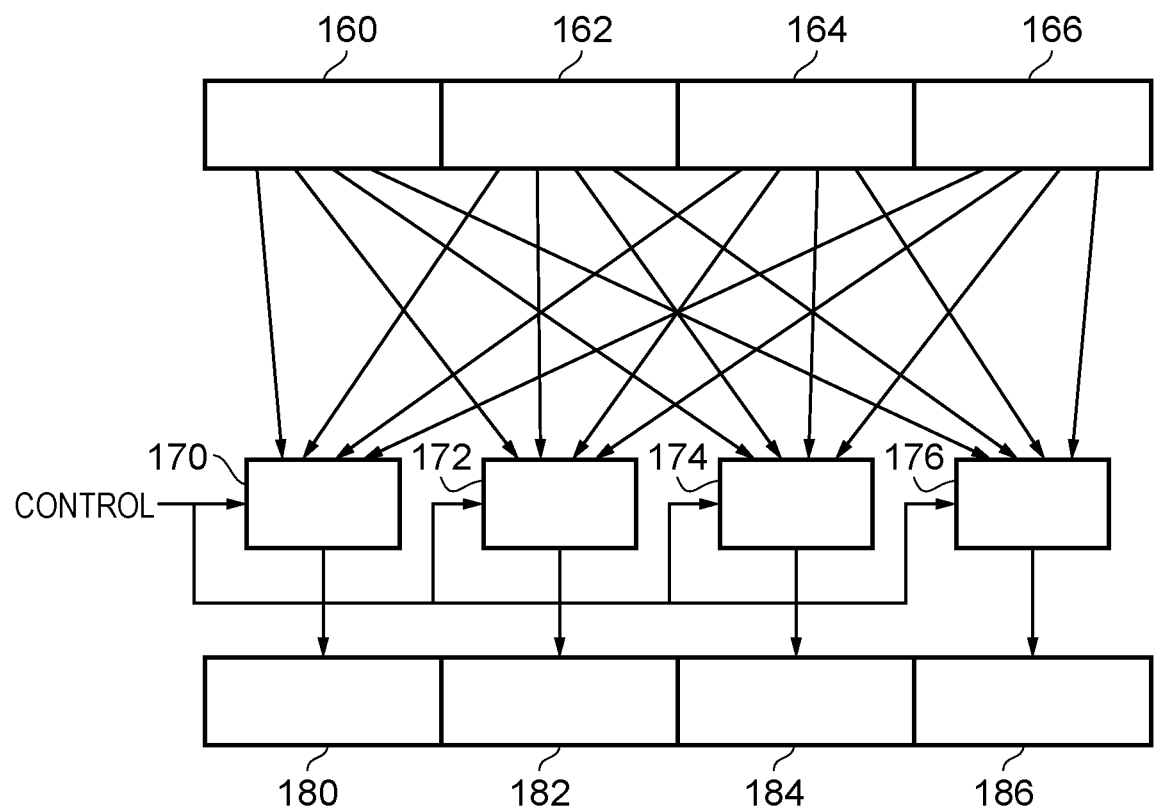

It should be appreciated that whilst the example shown in FIG. 4B gives a particular example of a selected (repeated) data element being used from the content of register B, generally it is clearly preferable a multi-purpose, flexible data processing apparatus to be provided with the ability for any data element in register B to be used as the input for any of the operation units 120-126. FIGS. 5A and 5B schematically illustrate two ways in which this may be achieved. FIG. 5A shows a set of storage components 130, 132, 134 and 136 which may for example store respective data elements in a register, connected to a set of operational units 140, 142, 144 and 146 (which may for example be fused multiply-add units). The connections between the storage units 130-136 and the functional units 140-146 are shown in FIG. 5A to be both direct and mediated via the multiplexer 148. Accordingly, this configuration provides that the content of any of the individual storage units 130-136 can be provided to any of the functional units 140-146, as a first input to each respective functional unit, and the content of storage units 130-136 can respectively be provided as the second input of the functional units 140-146. The result of the processing performed by the functional units 140-146 are transferred to the storage units 150-156, which may for example store respective data elements in a register. The multiplexer 148 and each of the functional units 140-146 are controlled by the control signals illustrated in order to allow the above mentioned flexible choice of inputs.

FIG. 5B schematically illustrates an alternative configuration to that of FIG. 5A in which each of the storage units 160, 162, 164, and 166 is directly connected to each of the functional units 170, 172, 174, and 176, each controlled by a respective control signal and the result of which is passed to the respective storage units 180, 182, 184, and 186. The approach taken by FIG. 5B avoids the need for, and delay associated with, using the multiplexer 148 of the FIG. 5B example, but at the price of the more complex wiring required. Both of the examples of FIG. 5A and FIG. 5B therefore illustrate the complexity that may arise when seeking to implement a fully flexible and configurable set of input storage units, operational units, and output storage units, in particular where the number of data elements concerned grows. For example, taking the example of FIG. 5A and doubling the number of input storage units, operational units, and output storage units to eight each would result in the need for an eightfold input multiplexer. On the other hand such an eight-wide implementation taking the approach of FIG. 5B would require eight paths from each input storage unit to each operation unit, i.e. 64 paths in total, as well as each operational unit needing to be capable of receiving eight different inputs and selecting between them. It will therefore be understood that the approach taken by embodiments of the present techniques which reuse data portions (e.g. data groups) across a register width enable limitations to be imposed on the multiplicity and complexity of the inputs to the required control units. Moreover though, it should be noted that in the above mentioned SVE/ASIMD context, the grouped element-by-vector instruction of FIG. 4A can be expected to be implementable as a single micro-operation, without the extra latency compared to the equivalent normal vector operation, because the selection and replication stays within a SVE vector granule and ASIMD already has the mechanisms to do this within 128 bits (e.g. using the "FMLA (by element)" instruction). As such the instruction shown in FIG. 4A can be expected to be more efficient than a sequence of a separate duplication (DUP) instructions followed by a normal vector operation.

Figure 6A:
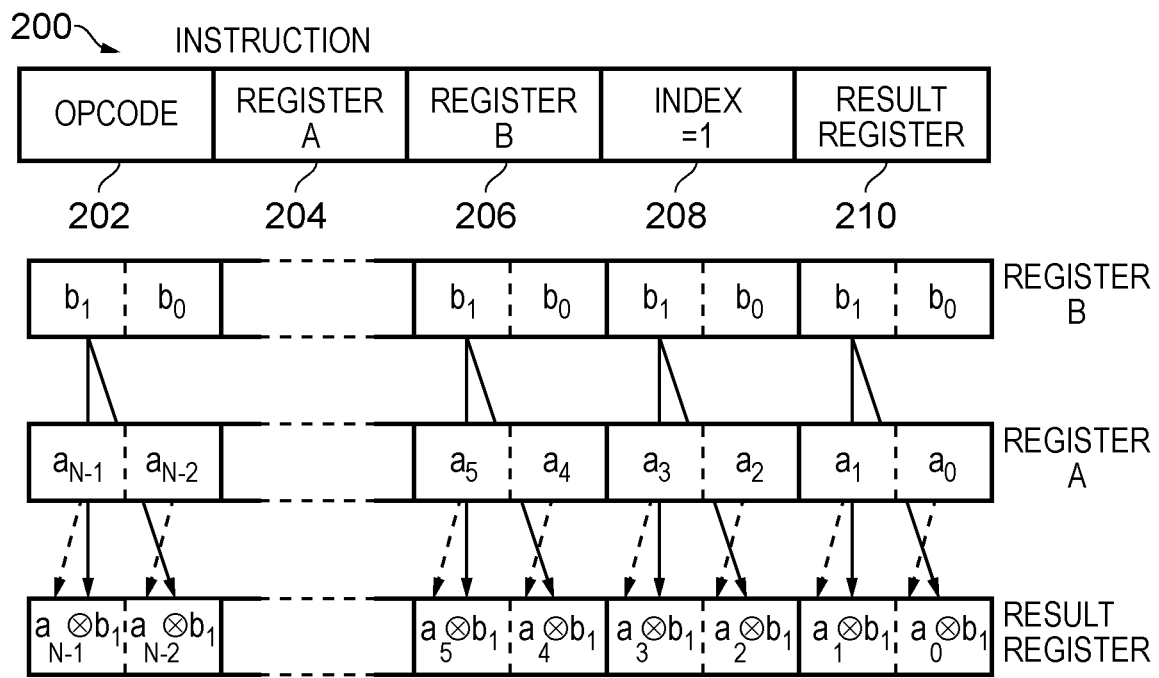
Figure 6B:
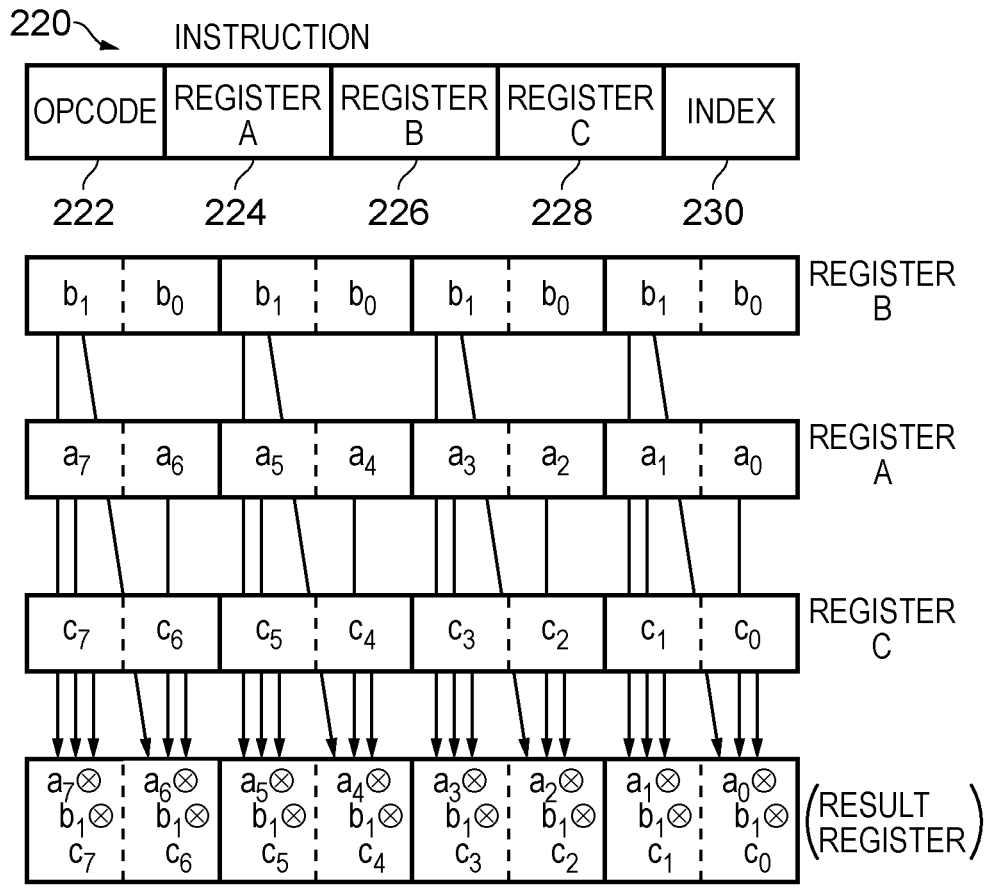

FIGS. 6A and 6B schematically illustrate two further examples of the data processing instruction for which an example was discussed with reference to FIGS. 4A and 4B. In the example of FIG. 6A the instruction 200 comprises an opcode 202, a first register specifier 204, a second register specifier 206, an immediate index value 208, and a result register specifier 210. The lower part of FIG. 6A schematically illustrates the execution of this instruction 200, wherein the specified data element (index 1) within a repeating sub-portion (data group) of register B is selected and this data element is multiplied by the vector represented by the respective data group of register A, to generate respective result data groups which populate the content of the result register. In FIG. 6A the operation performed between the respective data elements and data groups is shown by the generic operational symbol ⊗ indicating that although the example above is given of this being a multiplication, other operations are possible and contemplated.

The present techniques are not limited to such a data processing instruction only specifying one vector and FIG. 6B shows an example in which a data processing instruction 220 comprising an opcode 222, a first register specifier 224, a second register specifier 226, a third register specifier 228 and an index specifier 230 is provided. The lower part of FIG. 6B shows, in a similar way to that shown in FIG. 6A, how the selected data element (b1) in a first register (B) is combined with the data groups (vectors) taken from registers A and C and a result value is generated. Merely for the purposes of illustrating a variant, the result register in the example of FIG. 6B is not specified in the instruction 220, but rather a default (predetermined) result register is temporarily used for this purpose. Furthermore, whilst the combination of the components is shown in FIG. 6B again by means of the generic operator symbol ⊗, it should again be appreciated that this operation could take a variety of forms depending on the particular instruction being executed and whilst this may indeed be a multiply operation, it could also be any other type of arithmetic operation (addition, subtraction etc.) or could also be a logical operation (ADD, XOR, etc.).

FIG. 7A schematically illustrates another example data processing instruction and FIG. 7B shows the implementation of the execution of that data processing instruction in one embodiment. This data processing instruction is provided to support element-by-vector operations for complex numbers and is referred to here as a FCMLA (fused complex multiply-accumulate) instruction. As shown in FIG. 7A the example FCMLA instruction 220 comprises an opcode 222, a rotation specifier 224, a first register (A) specifier 226, a second register (B) specifier 228, an index specifier 230, and an accumulation register specifier 232. FIG. 7B illustrates that the execution of this instruction causes data groups in register A and register B to be accessed, wherein the data group in this instruction defines a number of complex elements. A complex element is represented by a pair of elements (see label "complex pair" in FIG. 7B). In the example of FIG. 7B, the complex pairs of register B are (b3,b2) and (b1,b0), and complex pair (b3,b2) is selected. The complex pairs of register A are (a7,a6), (a5,a4), (a3,a2), and (a1,a0). The complex pairs selected from register A and B (all complex pairs from register A and a selected complex pair from the data groups of register B identified by the index 230) are passed to the complex fused multiply-accumulate (CFMA) units 234, 236, 238, 240, where each complex pair from register A forms one input to each of the CFMA units respectively, whilst the selected complex pair from one data group in register B forms another input to CFMA units 234 and 236 and the other selected complex pair from the next data group in register B forms another input to CFMA units 238 and 240. The respective results of the complex fused multiply-accumulation operations are accumulated as respective complex pairs in the specified accumulation register, which in turn each form the third input to each of the respective CFMA units. The rotation parameter 224 (which is optionally specified in the instruction) is a 2-bit control value that changes the operation as follows (just showing the first pair, where (c1,c0) is the accumulator value before the operation):

| Rotation | Resulting complex pair (c1, c0) |
|----------|--------------------------------|
| 00 | (c1 + a1 * b3, c0 + a1 * b2) |
| 01 | (c1 − a1 * b3, c0 + a1 * b2) |
| 10 | (c1 − a0 * b2, c0 − a0 * b3) |
| 11 | (c1 + a0 * b2, c0 − a0 * b3) |

Figure 8:
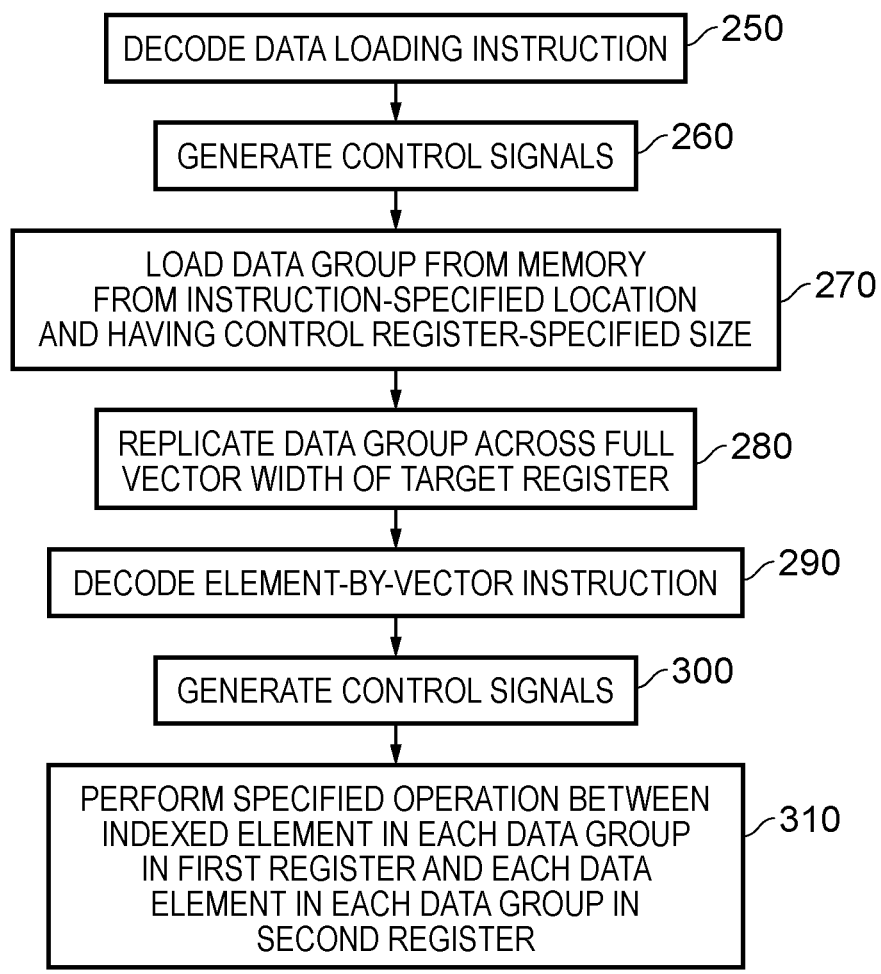

FIG. 8 shows a sequence of steps which are taken according to the method of one embodiment. The flow begins at step 250 where a data loading (preparation) instruction is decoded and at step 260 the corresponding control signals are generated. These control signals then cause, at step 270, a specified data group to be loaded from memory from an instruction specified location (see for example FIGS. 2 and 3 for examples of this) and having a control register specified size. The control signals then further cause the loaded data group to be replicated across the vector width at step 280 of a specified target register (specified in the data loading (preparation) instruction). Execution of the data loading instruction is then complete. The flow proceeds to step 290 where an element-by-vector data processing instruction is decoded. Corresponding control signals are then generated at step 300 and subsequently at step 310 the operation specified by the element-by-vector instruction is then performed between an indexed element in each data group in the first register specified in the instruction and each data element in each data group of a second register specified in the instruction.

Figure 9A:
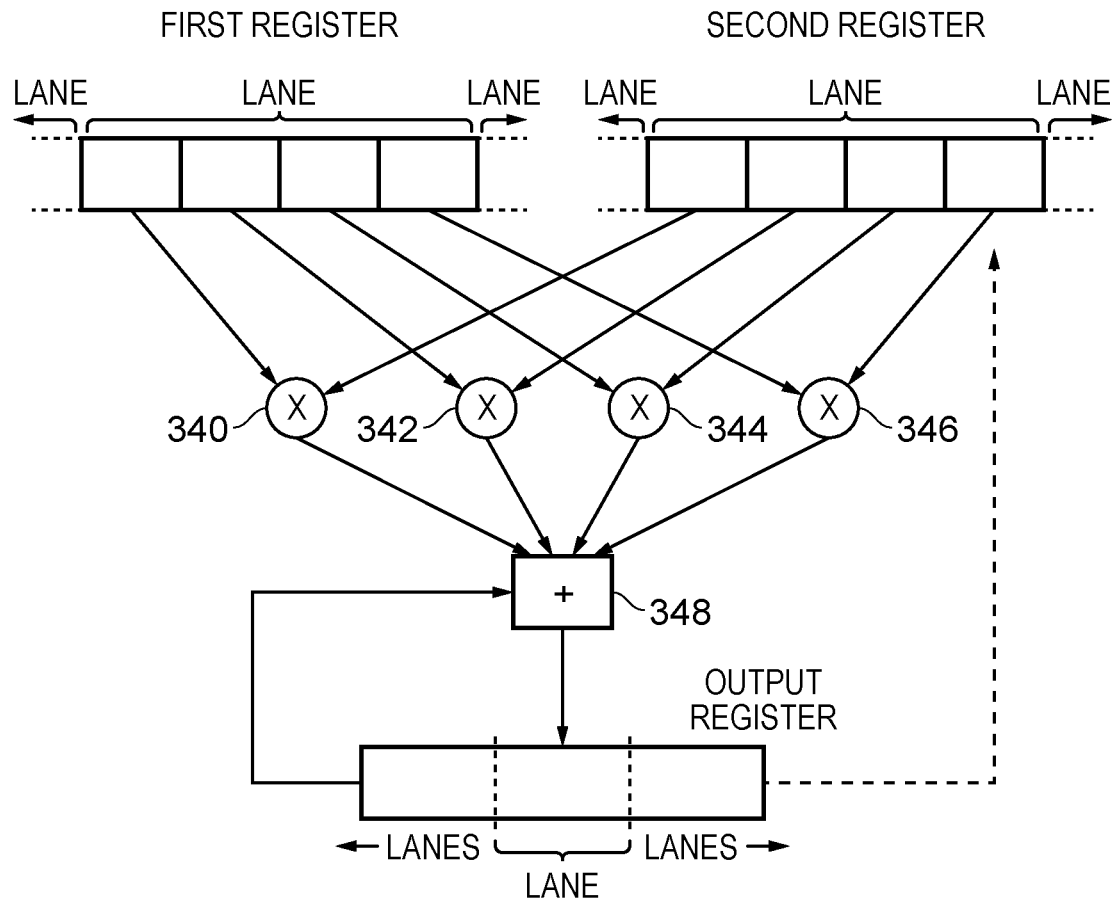
Figure 9B:
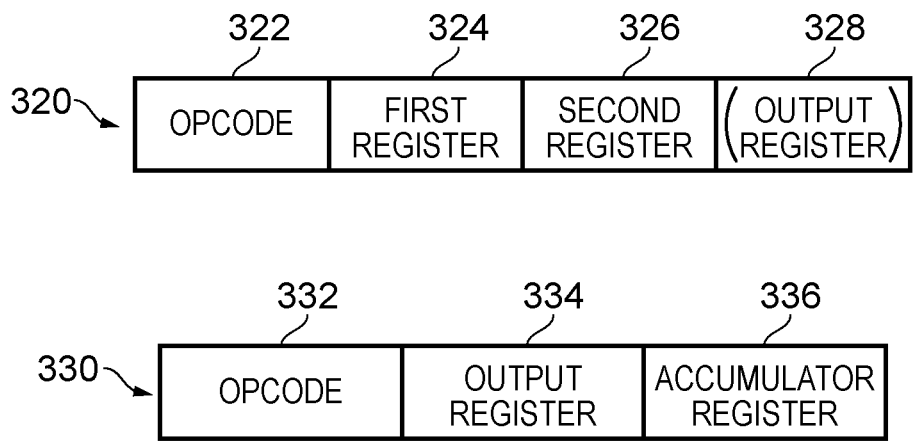

FIG. 9A schematically illustrates the execution of a different data processing instruction according to the present techniques. FIG. 9B shows two examples of such an instruction, the first 320 comprising an opcode 322, a first register specifier 324, a second register specifier 326, and (optionally) an output register specifier 328. The second example data processing instruction 330 shown in FIG. 9B comprises an opcode 332, an output register specifier 334, and an accumulator register specifier 336. These are explained with reference to FIG. 9A. The first and second source registers specified by the data processing instruction are shown at the top of FIG. 9A, each sub-divided into data element portions grouped into lanes. In response to the data processing instruction the data processing apparatus (i.e. the processing circuitry under control of the control signals generated by the decoder circuitry) retrieves a set of data elements from each of the first source register and the second source register. In the example shown in FIG. 9A a set of four data elements are retrieved from each lane of the first and second source registers. These are brought together pair-wise at the operational units 340, 342, 344, and 346, which are arranged to perform multiply operations. The result of these multiply operations are brought together at the summation unit 348 and finally the result value thus generated is written into a corresponding lane of an output register. In other words, a "dot product" operation is carried out. The labelling of the lanes in FIG. 9A illustrates the fact that the four multiply units 340-346 and the summation unit 348 represent only one set of such units provided in the data processing apparatus' processing circuitry and these are correspondingly repeated to match each of the lanes which the data processing apparatus can handle for each register. The number of lanes in each register is intentionally not definitively illustrated in FIG. 9A corresponding to the fact that the number of lanes may be freely defined depending on the relative width of the data elements, the number of data elements in each lane, and the available register width. It can be seen therefore that the instruction behaves similarly to a same-width operation at the accumulator width (e.g. in an example of 8-bit values (say, integers) in 32-bit wide lanes, it behaves similarly to a 32 bit integer operation). However, within each lane, instead of a 32×32 multiply being performed, the 32-bit source lanes are considered to be made up of four distinct 8-bit values, and a dot product operation is performed across these two "mini-vectors". The result is then accumulated into the corresponding 32-bit lane from the accumulator value. It will be appreciated that the figure only explicitly depicts the operation within a single 32-bit lane. Taking one example of a 128-bit vector length, the instruction would effectively perform 32 operations (16 multiplies and 16 adds), which is 3-4× denser than comparable contemporary instructions. If implemented into an architecture which allows longer vectors, such as the Scalable Vector Extensions (SVE) provided by ARM® Limited of Cambridge, UK, these longer vectors would increase the effective operation count accordingly. Further should be appreciated that whilst a specific example of a 32-bit lane width is shown, many different width combinations (both in input and output) are possible, e.g. 16-bit×16-bit→64-bit or 16-bit×16-bit→32-bit. "By element" forms (where, say, a single 32-bit lane is replicated for one of the operands) are also proposed. The dashed arrow joining the output register to the second register in FIG. 9A schematically represents the fact that the second register may in fact be the output register, allowing for an accumulation operation with respect to the content of this register to be performed. Returning to consideration of FIG. 9B, note that two distinct instructions are illustrated here. Generally, the first illustrated instruction may cause all of the operations illustrated in FIG. 9A to be carried out, but embodiments are also provided in which the first illustrated instruction in FIG. 9B only causes the multiply and summation operation to be carried out and the subsequent accumulation operation taking the result in the output register and applying it to the accumulator register may be carried out by the second illustrated instruction specifically purposed to that task.

Figure 10:
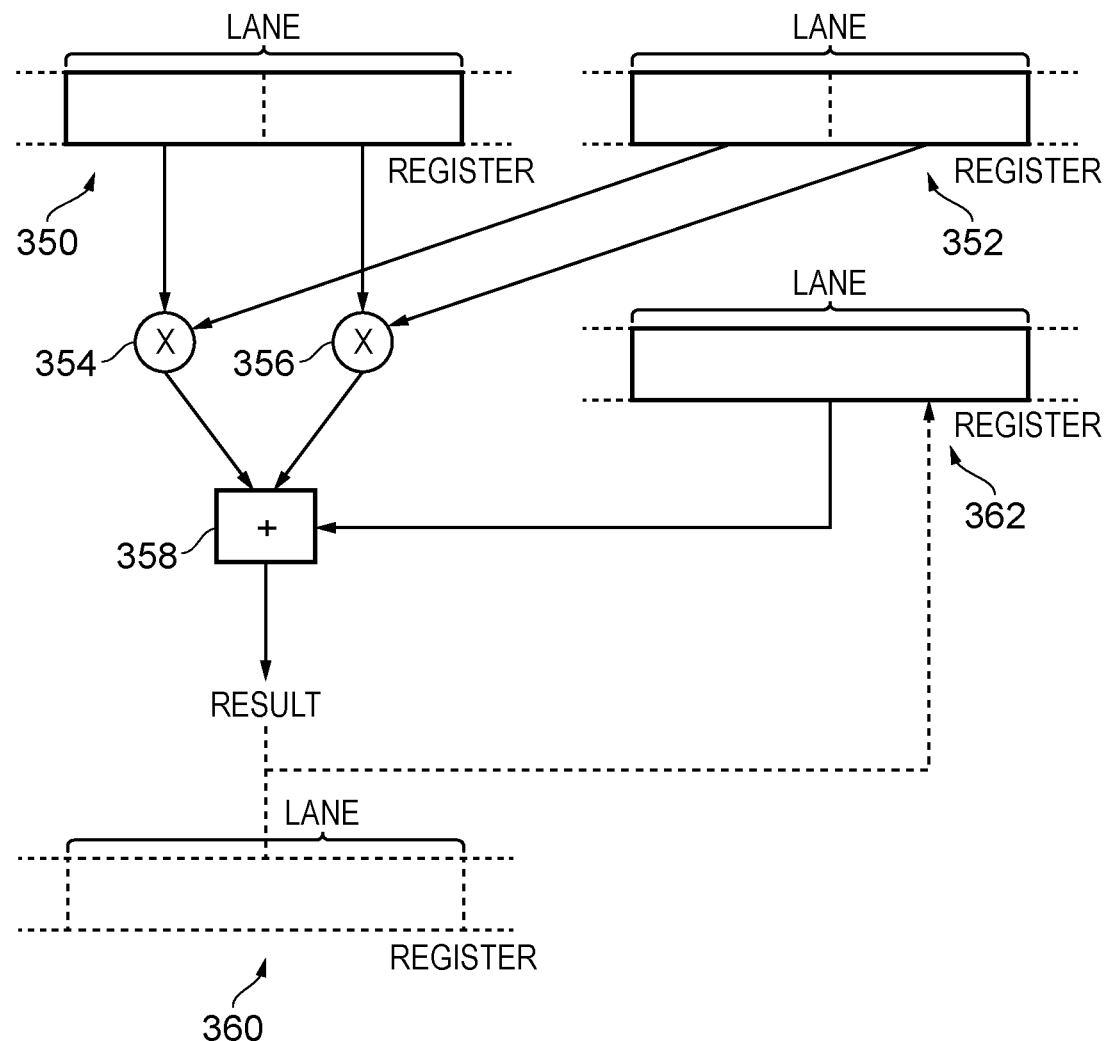

FIG. 10 schematically illustrates some variations in embodiments of the execution of the data processing instructions shown in FIG. 9B. Here, for clarity of illustration only, the number of data elements accessed in each of two source registers 350 and 352 are reduced to two. Correspondingly only two multiply units 354 and 356 are provided (for each lane) and one summation unit 358 (for each lane). Depending on the particular data processing instruction executed, the result of the "dot product" operation may be written to a specified output register 360 (if specified) or may alternatively be written to an accumulation register 362 (if so specified). In the latter case, where an accumulation register is defined, the content of this accumulation register may be taken as an additional input to the summation unit 358, such that the ongoing accumulation can be carried out.

Figure 11:
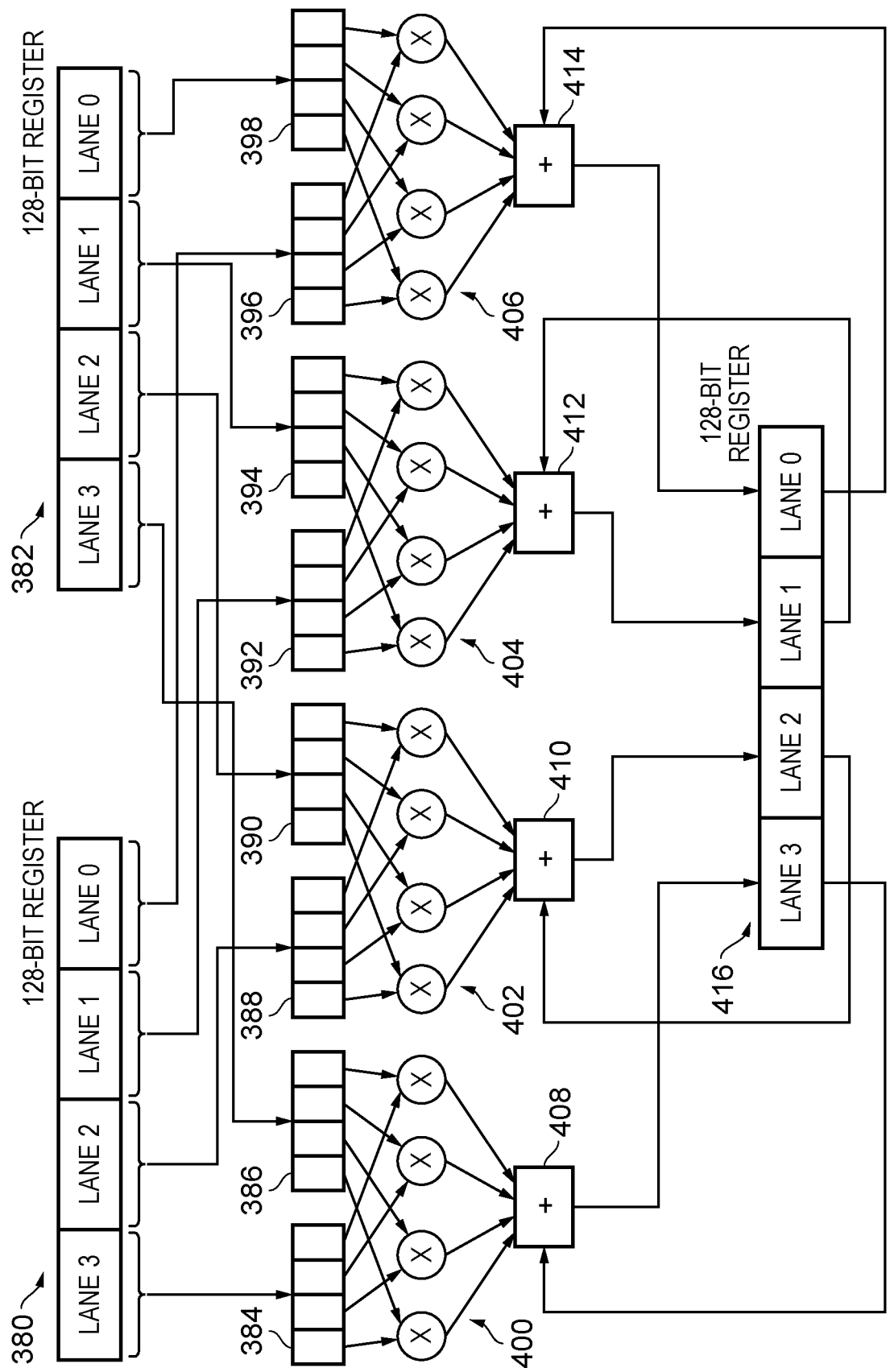
Figure 12:
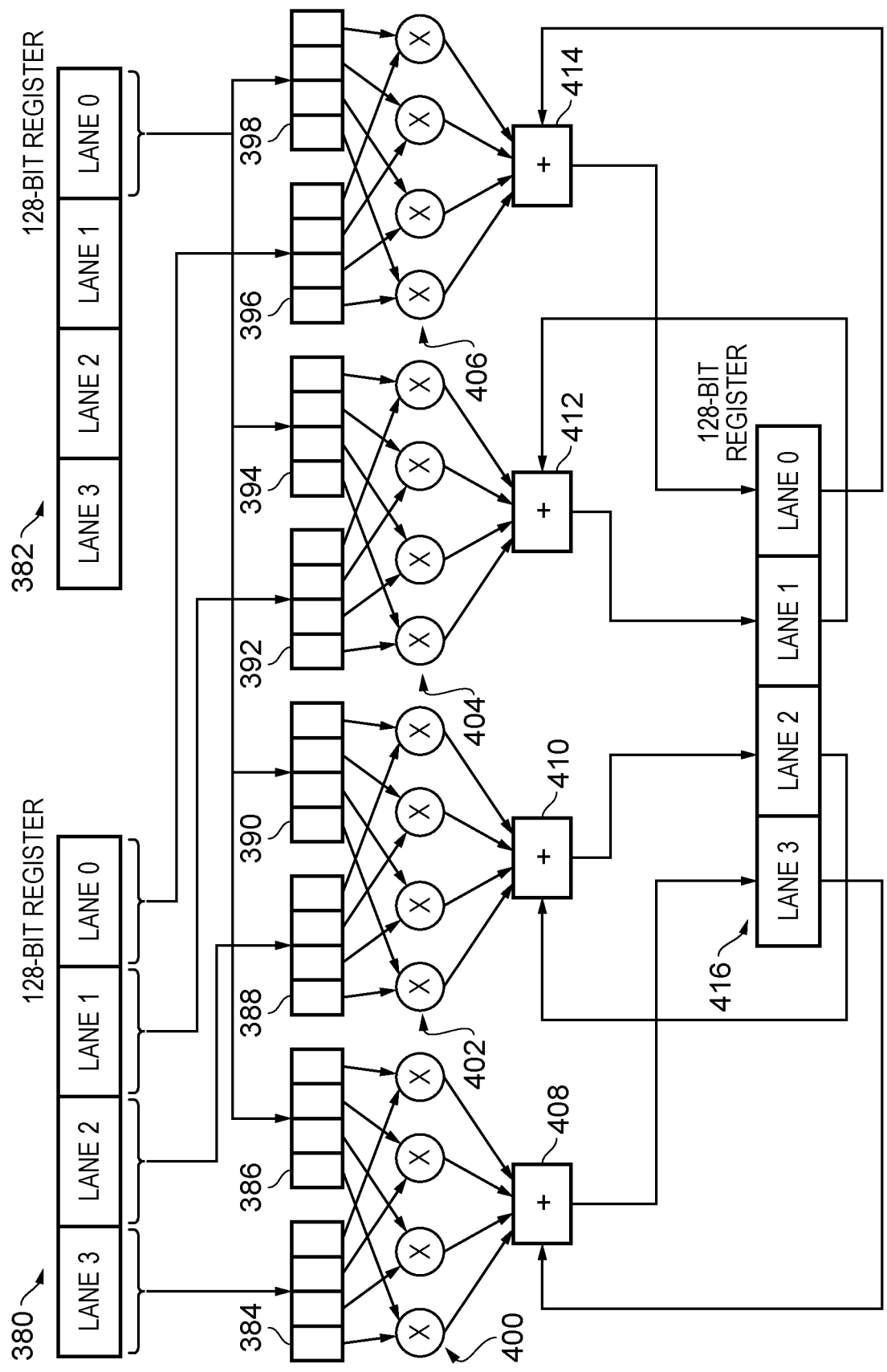
FIG. 12 shows a variant on the embodiment of FIG. 11.

FIG. 11 schematically illustrates a more complex example in which two 128-bit registers 380 and 382 are the source registers for one of the above mentioned "dot product" data processing operation instructions. Each of these source registers 380 and 382 is treated in terms of four independent lanes (lanes 0-3) and the respective content of these lanes is taken into temporary storage buffers 384-398 such that respective content of the same lane from the two source registers are brought into adjacent storage buffers. Within each storage buffer the content data elements (four data elements in each in this example) then provide the respective inputs to a set of four multiply units provided for each lane 400, 402, 404, and 406. The output of these then feed into respective summation units 408, 410, 412, and 414 and the output of each of these summation units is passed into the respective corresponding lane of an accumulation register 416. The respective lanes of the accumulation register 416 provide the second type of input into the summation units (accumulators) 408-414. FIG. 12 shows the same basic configuration to that of FIG. 11 and indeed the same subcomponents are represented with the same reference numerals and are not described again here. The difference between FIG. 12 and FIG. 11 is that whilst the content of each of the four lanes of the 128-bit register 380 (source register) is used only a first lane content from the second 128-bit source register 382 is used and this content is duplicated to each of the temporary storage units 386, 390, 394, and 398. This lane, selected as the (only) lane which provides content from the source register 382 in this example, is specified by the instruction. It will be appreciated that there is no significance associated with this particular lane (lane 0), which has been chosen for this example illustration and any of the other lanes of source register 382 could equally well be specified. The specification of the selected lane is performed by the setting of an index value in the instruction, as for example is shown in the example instruction of FIG. 4A.

Figure 13:
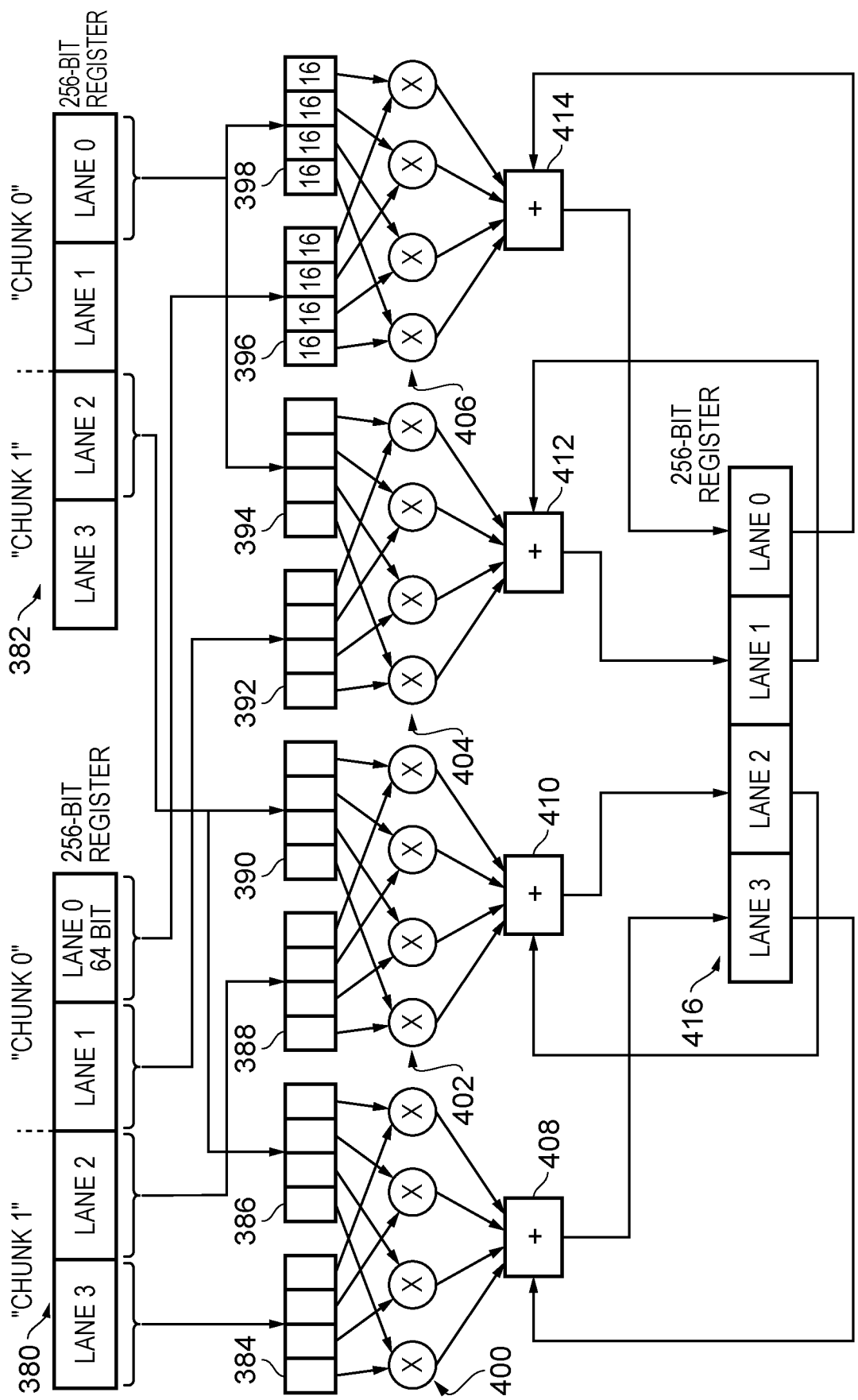
FIG. 13 shows a further variant on the examples shown in FIGS. 11 and 12.

A further variant on the examples shown in FIGS. 11 and 12 is shown in FIG. 13. Again the same subcomponents are reused here, given the same reference numerals, and are not described again for brevity. The difference shown in FIG. 13 with respect to the examples of FIGS. 11 and 12 is that the four lanes of each of the source registers 380 and 382 are themselves treated in two data groups (also referred to as "chunks" herein, and labelled chunk 0 and chunk 1 in the figure). This does not affect the manner in which the content of the register 380 is handled, the content of its four lanes being transferred to the temporary storage units 384, 388, 392 and 396 as before. However, the extraction and duplication of a single lane content as introduced with the example of FIG. 12 is here performed on a data group by data group basis ("chunk-by-chunk" basis), such that the content of lane 0 of register 382 is replicated and transferred to the temporary storage buffers 394 and 398, whilst the content of lane 2 in chunk 1 is duplicated and transferred into the temporary storage buffers 386 and 390. It is to be noted that the operation shown in FIG. 13 can be considered to be a specific example of the more generically illustrated FIG. 4B, where the "operation" in that figure carried out by the four processing units 120-126 here comprises the dot product operation described. Again, it will be appreciated that there is no significance associated with the particular lanes selected in this illustrated example (lanes 2 and 0, as the "first" lanes of each chunk), these having been specified by the setting of an index value in the instruction, as for example is shown in the example instruction of FIG. 4A. Finally note that the execution of the data processing instruction illustrated in FIG. 13 may usefully be preceded by the execution of a data preparation instruction, such as those shown in FIGS. 2 and 3 and discussed above, in order suitably to prepare the content of the source registers.

Figure 14:
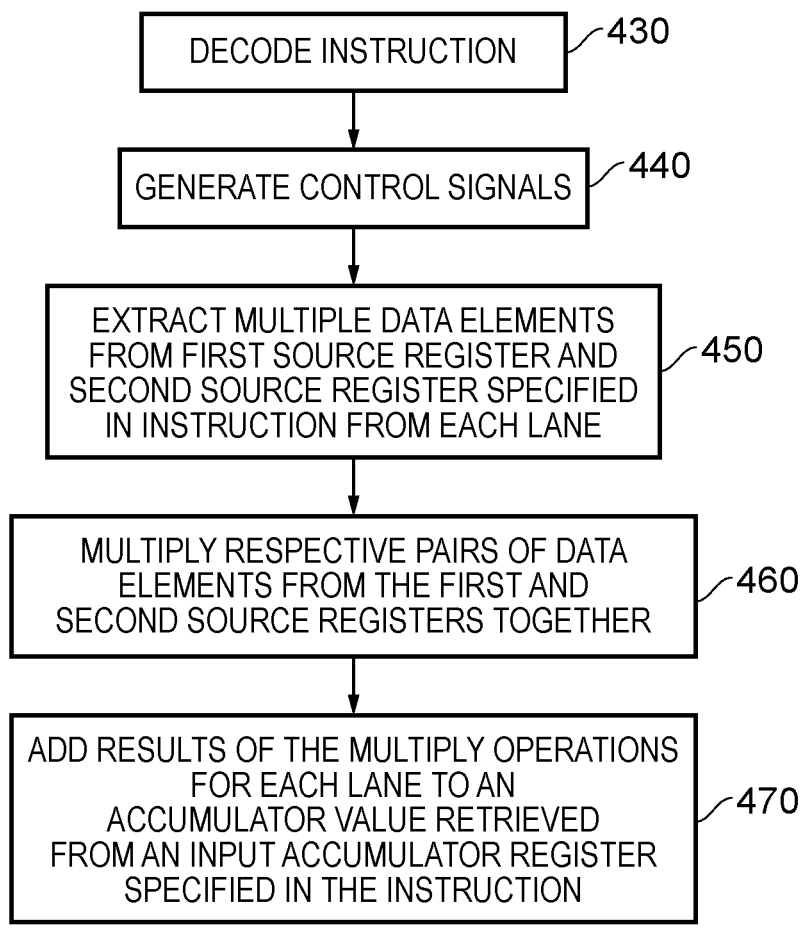
FIG. 14 shows a sequence of steps which are taken according to the method of one embodiment.

FIG. 14 shows a sequence of steps which are taken according to the method of one embodiment when executing a data processing instruction to perform a dot product operation such as those discussed above with reference to FIGS. 9A-13. The flow begins at step 430 where the instruction is decoded and at step 440 the corresponding control signals are generated. Then at step 450 multiple data elements are extracted from the first source register and the second source register specified in the instruction on a lane-by-lane basis and at step 460 respective pairs of data elements from the first and second source registers are multiplied together in each lane in order to perform the first part of the dot product operation. Then, at step 470 the results of the respective multiplier operations are added together, again on a lane-by-lane basis, and are added (in this example) to an accumulator value which has been retrieved from a input accumulator register also specified in the instruction.

FIG. 15A schematically illustrates the execution of a data processing instruction provided by some embodiments. FIG. 15B shows a corresponding example instruction. This example instruction 500 comprises an opcode 502, a first source register specifier 504, a second source register specifier 506, and a set of accumulation registers specifier 508. Implemented in the example of FIG. 15A the first and second source registers 510 and 512 are shown at the top of the figure from which in response to execution of the data processing instruction, data elements are extracted. All (four) data elements are extracted from the first source register 510 individually, whilst the four data elements which make up the full content of the second source register 512 are extracted as a block. The content of the second source register 512 is passed to each of four operational units, namely the fused multiply-add (FMA) units 514, 516, 518, and 520. Each of the four data elements extracted from the first source register 510 are passed to a respective one of the FMA units 514-520. Each of the FMA units 514 and 520 is controlled by respective control signals, as illustrated. Accordingly, the execution of the data processing instruction in the example of FIG. 15A causes the data processing circuitry (represented by the four FMA units) to perform four vector-by-element multiply/accumulate operations simultaneously. It should be noted that the present techniques are not limited to a multiplicity of four, but this has been found to be a good match for the load:compute ratios that are typically available in such contemporary processing apparatuses. The output of the FMA units is applied to a respective register of the set of accumulation registers specified in the instruction (see item 508 in FIG. 15B). Moreover, the content of these four accumulation registers 522, 524, 526, and 528 form another input to each of the FMA units 514-520, such that an accumulation is carried out on the content of each of these registers.

FIG. 16 shows an example visualisation of the example of FIG. 15A, representing a simple matrix multiply example, where a subject matrix A and subject matrix B are to be multiplied by one another to generate a result matrix C. In preparation for this a column (shaded) of matrix A has been loaded into register v0 and a row (shaded) of matrix B has been loaded into register v2. The accumulators for the result matrix C are stored in the registers v4-v7. Note that although the values loaded from matrix A are depicted as a column, the matrices are readily transposed and/or interleaved such that the contiguous vector loads from each source array can be performed. It is to be noted in this context that matrix multiplication is an $O(n^3)$ operation and therefore auxiliary tasks to prepare the matrix data for processing would be an $O(n^2)$ operation and thus a negligible burden for sufficiently large n. An instruction corresponding to the example shown could be represented as FMA4 v4-v7, v2, v0[0-3]. Here the FMA4 represents the label (or equivalently the opcode) of this instruction, whilst v4-v7 are the set of accumulation registers, v2 is the source register from which the full content is taken, whilst v0 is the source register from which a set of data elements (indexed 0-3) are taken. Execution of this instruction then results in the four operations:

$$v4+=v2*v0[0],$$

$$v5+=v2*v0[1],$$

$$v6+=v2*v0[2], \text{ and}$$

$$v7+=v2*v0[3].$$

FIG. 17 represents a simpler version of the examples shown in FIG. 15A, where in this example only two data elements are derived from each of the first and second source registers 540 and 542. Both data elements extracted from register 542 are passed to each of the FMA units 544 and 546, whilst a first data element from register 540 is passed to the FMA unit 544 and a second data element is passed to the FMA unit 546. The content of the accumulation registers 548 and 550 provide a further input to each of the respective FMA units and the accumulation result is applied to each respective accumulation register. Conversely FIG. 18 illustrates an example where more data elements are extracted from each of the source registers with these (eight in this example) being extracted from each of the source registers 560 and 562. The full content of register 562 provided to each of the FMA units 564-578, whilst a selected respective data element from register 560 is provided as the other input. The result of the multiply-add operations are accumulated in the respective accumulation registers 580-594.

FIG. 19 shows an example giving more detail of some specific multiplication operations which are performed in one example. Here the two source registers v0 and v2 are each treated in two distinct data groups. The two data groups of register v0 also represent portions of the register across which a selected data element is replicated, in the example of FIG. 19 this being the "first" data element of each portion, i.e. elements [0] and [4] respectively. The selected data element can be specified in the instruction by means of an index. Thus, in a first step in the data operation shown in FIG. 19 the data element of these two data groups of the register v0 are replicated across the width of each portion as shown. Thereafter these provide the inputs to four multipliers 600, 602, 604, and 606, whilst the other input is provided by the content of the register v2. Then the multiplication of the respective data elements of v2 with the respective data elements of v0 is performed and the results are applied to the target registers v4-v7, wherein the sub-division into two data groups is maintained into these four accumulation registers as shown by the specific calculations labelled for each data group of each accumulation register. Note that the execution of the data processing instruction illustrated in FIG. 19 may usefully be preceded by the execution of a data preparation instruction, such as those shown in FIGS. 2 and 3 and discussed above, in order suitably to prepare the content of the source registers.

FIG. 20 shows an example where the content of two source registers 620 and 622 are treated as containing data elements in two independent lanes (lane 0 and lane 1). Within each lane two sub-portions are defined and this "laning" of the content is maintained throughout the calculation i.e. through the FMA units 624, 626, 628, and 630, and finally into the accumulation registers 632 and 634.

FIG. 21 shows a sequence of steps which are taken according to the method of one embodiment when processing a data processing instruction such as that described with respect to the examples of FIG. 15A to FIG. 20. The flow begins at step 650 where the data processing instruction is decoded and at step 652 the corresponding control signals are generated. Then at step 654 N data elements are extracted from the first source register specified in the data processing instruction, whilst at step 656 the N data elements are multiplied by content of the second source register specified in the data processing instruction. At step 658 the N result values of these multiply operations are then applied to the content of N respective accumulation registers specified in the data processing instruction. It will be appreciated in the light of the preceding description that the execution of the instruction as described with respect to FIG. 21, and equally the execution of the instruction as described with respect to FIG. 14, may usefully be preceded by the execution of a data preparation instruction, such as those shown in FIGS. 2 and 3 and discussed above, in order suitably to prepare the content of the source registers.

FIG. 22 illustrates a virtual machine implementation that may be used. Whilst the above described embodiments generally implement the present techniques in terms of apparatus and methods for operating specific processing hardware supporting the techniques concerned, it is also possible to provide so-called virtual machine implementations of hardware devices. These virtual machine implementations run on a host processor 730 typically running a host operating system 720 supporting a virtual machine program 710. This may require a more powerful processor to be provides in order to support a virtual machine implementation which executes at a reasonable speed, but such an approach may be justified in certain circumstances, such as when there is a desire to run code native to another processor for compatibility or re-use reasons. The virtual machine program 710 provides an application program interface to an application program 700 which is the same as the application program interface which would be provided by the real hardware which is the device being modelled by the virtual machine program 710. Thus, program instructions including one or more examples of the above-discussed processor state check instruction may be executed from within the application program 700 using the virtual machine program 710 to model their interaction with the virtual machine hardware.

In brief overall summary a data processing apparatus, a method of operating a data processing apparatus, a non-transitory computer readable storage medium, and an instruction are provided. The instruction specifies a first source register and a second source register. In response to the instruction control signals are generated, causing processing circuitry to perform a dot product operation. For this operation at least a first data element and a second data element are extracted from each of the first source register and the second source register, such that then at least first data element pairs and second data element pairs are multiplied together. The dot product operation is performed independently in each of multiple intra-register lanes across each of the first source register and the second source register. A widening operation with a large density of operations per instruction is thus provided.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing apparatus comprising:
register storage circuitry having a plurality of registers to store data elements;
decoder circuitry responsive to a data processing instruction to generate control signals, the data processing instruction specifying in the plurality of registers: a first source register, a second source register and an output register each divided into a plurality of independent intra-register lanes, wherein the first source register comprises a plurality of first source data elements and the second source register comprises a plurality of respective second source data elements and each of the first source data elements corresponds to a respective second source data element of the plurality of respective second source data elements, and wherein the plurality of first source data elements and the respective plurality of respective second source data elements are grouped into the plurality of independent intra-register lanes; and
processing circuitry responsive to the control signals to perform, independently for each intra-register lane of the plurality of independent intra-register lanes, a dot product operation comprising:
extracting at least a first data element and a second data element from the plurality of first source data elements grouped into the intra-register lane;
extracting at least a corresponding first data element and a corresponding second data element from the respective plurality of second source data elements grouped into the intra-register lane;
performing a first multiply operation of multiplying together the first data element and the corresponding first data element;

performing a second multiply operations of multiplying together the second data element and the corresponding second data element;

summing results of the first multiply operation and the second multiply operation; and applying a result of the summing to an output element of the output register, wherein the output element is grouped into the intra-register lane of the output register, wherein the data processing instruction specifies a repeated intra-register lane and a selected source register of the first source register and the second source register, and wherein the processing circuitry is responsive to the control signals to reuse content of the repeated intra-register lane for all lanes of the selected source register.

2. The data processing apparatus as claimed in claim 1, wherein the output register is an accumulator register and the dot product operation is a dot product and accumulate operation which further comprises loading an accumulator value from the accumulator register and summing the results of the multiply operations with the accumulator value.

3. The data processing apparatus as claimed in claim 1, wherein the decoder circuitry is responsive to a further data processing instruction to generate further control signals, the data processing instruction specifying in the plurality of registers the output register and an accumulator register, and the processing circuitry is responsive to the further control signals to perform an accumulate operation comprising:

loading an accumulator value from the accumulator register and a summation value from the intra-register lane of the output register;

summing the accumulator value and the summation value; and storing a result of the summing in the accumulator register.

4. The data processing apparatus as claimed in claim 1, wherein widths of the first source register, of the second source register, and of the output register are equal.

5. The data processing apparatus as claimed in claim 2, wherein widths of the first source register, of the second source register, of the output register, and of the accumulator register are equal.

6. The data processing apparatus as claimed in claim 1, wherein a width of the first source register is equal to a combined size of all data elements extracted from the first source register in the dot product operation.

7. The data processing apparatus as claimed in claim 1, wherein a width of the second source register is equal to a combined size of all data elements extracted from the second source register in the dot product operation.

8. The data processing apparatus as claimed in claim 1, wherein the dot product operation further comprises extracting at least a third data element and a fourth data element from the plurality of first source data elements grouped into the intra-register lane, extracting at least a corresponding third data element and a corresponding fourth data element from the respective plurality of second source data elements grouped into the intra-register lane, performing further multiply operations of multiplying together the third data element and the corresponding third data element, and multiplying together the fourth data element and the corresponding fourth data element, and summing results of the further multiply operations with the results of the first multiply operation and the second multiply operation.

9. The data processing apparatus as claimed in claim 1, wherein a size of each intra-register lane is equal to a combined size of all data elements extracted from the intra-register lane of the first source register in the dot product operation.

10. The data processing apparatus as claimed in claim 1, wherein a size of each intra-register lane is equal to a combined size of all data elements extracted from the intra-register lane of the second source register in the dot product operation.

11. The data processing apparatus as claimed in claim 1, wherein the plurality of intra-register lanes have a 32-bit width and the extracting comprises extracting four 8-bit data elements from each intra-register lane of the first source register and the second source register.

12. The data processing apparatus as claimed in claim 1, wherein the plurality of intra-register lanes have a 64-bit width and the extracting comprises extracting four 16-bit data elements from each intra-register lane of the first source register and the second source register.

13. The data processing apparatus as claimed in claim 1, wherein the multiply operations and adding are integer operations.

14. The data processing apparatus as claimed in claim 1, wherein values held in the first source register and in the second source register are signed values.

15. The data processing apparatus as claimed in claim 1, wherein values held in the first source register and in the second source register are unsigned values.

16. The data processing apparatus as claimed in claim 1, wherein the multiply operations and adding are floating-point operations.

17. The data processing apparatus as claimed in claim 16, wherein the plurality of intra-register lanes have a 32-bit width and the extracting comprises extracting two 16-bit floating point data elements from each intra-register lane of the first source register and the second source register.

18. The data processing apparatus as claimed in claim 16, wherein the plurality of intra-register lanes have a 64-bit width and the extracting comprises extracting two 32-bit floating point data elements from each intra-register lane of the first source register and the second source register.

19. A virtual machine provided by a computer program stored on a non-transitory storage medium and executing upon a data processing apparatus, said virtual machine providing an instruction execution environment corresponding to the data processing apparatus of claim 1.

20. A method of operating a data processing apparatus comprising:

generating control signals in response to a data processing instruction, the data processing instruction specifying in a plurality of registers: a first source register, a second source register and an output register each divided into a plurality of independent intra-register lanes, wherein the first source register comprises a plurality of first source data elements and the second source register comprises a plurality of respective second source data elements and each of the first source data elements corresponds to a respective second source data element of the plurality of respective second source data elements, and wherein the plurality of first source data elements and the respective plurality of respective second source data elements are grouped into the plurality of independent intra-register lanes; and performing, in response to the control signals and independently for each intra-register lane of the plurality of independent intra-register lanes, a dot product operation comprising:

extracting at least a first data element and a second data element from the plurality of first source data elements grouped into the intra-register lane;

extracting at least a corresponding first data element and a corresponding second data element from the respective plurality of second source data elements grouped into the intra-register lane;

performing a first multiply operation of multiplying together the first data element and the corresponding first data element;

performing a second multiply operations of multiplying together the second data element and the corresponding second data element;

summing results of the first multiply operation and the second multiply operation; and applying a result of the summing to an output element of the output register, wherein the output element is grouped into the intra-register lane of the output register, wherein the data processing instruction specifies a repeated intra-register lane and a selected source register of the first source register and the second source register, and wherein the dot-product operation is responsive to the control signals to reuse content of the repeated intra-register lane for all lanes of the selected source register.

21. A non-transitory computer-readable storage medium storing in a non-transient fashion a program comprising at least one data processing instruction which when executed by a data processing apparatus causes:

generation of control signals in response to the data processing instruction, the data processing instruction specifying, in register storage circuitry of the data processing apparatus, a first source register, a second source register each divided into a plurality of independent intra-register lanes, wherein the first source register comprises a plurality of first source data elements and the second source register comprises a plurality of respective second source data elements and each of the first source data elements corresponds to a respective second source data element of the plurality of respective second source data elements, and wherein the plurality of first source data elements and the respective plurality of respective second source data elements are grouped into the plurality of independent intra-register lanes; and performance of, in response to the control signals and independently for each intra-register lane of the plurality of independent intra-register lanes, a dot product operation comprising:

extracting at least a first data element and a second data element from the plurality of first source data elements grouped into the intra-register lane;

extracting at least a corresponding first data element and a corresponding second data element from the respective plurality of second source data elements grouped into the intra-register lane;

performing a first multiply operation of multiplying together the first data element and the corresponding first data element;

performing a second multiply operations of multiplying together the second data element and the corresponding second data element;

summing of results of the first multiply operation and the second multiply operation; and, applying a result of the summing to an output element of the output register, wherein the output element is grouped into the intra-register lane of the output register, wherein the data processing instruction specifies a repeated intra-register lane and a selected source register of the first source register and the second source register, and wherein the dot-product operation is responsive to the control signals to reuse content of the repeated intra-register lane for all lanes of the selected source register.

22. A data processing apparatus comprising:

means for storing data elements in a plurality of registers;

means for decoding a data processing instruction to generate control signals, the data processing instruction specifying in the plurality of registers: a first source register, a second source register and an output register each divided into a plurality of independent intra-register lanes, wherein the first source register comprises a plurality of first source data elements and the second source register comprises a plurality of respective second source data elements and each of the first source data elements corresponds to a respective second source data element of the plurality of respective second source data elements, and wherein the plurality of first source data elements and the respective plurality of respective second source data elements are grouped into the plurality of independent intra-register lanes; and means for performing, in response to the control signals and independently in each intra-register lane of the plurality of independent intra-register lanes, a dot product operation comprising:

extracting at least a first data element and a second data element from the plurality of first source data elements grouped into the intra-register lane;

extracting at least a corresponding first data element and a corresponding second data element from the respective plurality of second source data elements grouped into the intra-register lane;

performing a first multiply operation of multiplying together the first data element and the corresponding first data element;

performing a second multiply operations of multiplying together the second data element and the corresponding second data element;

summing results of the first multiply operation and the second multiply operation; and applying a result of the summing to an output element of the output register, wherein the output element is grouped into the intra-register lane of the output register, wherein the data processing instruction specifies a repeated intra-register lane and a selected source register of the first source register and the second source register, and wherein the means for performing is responsive to the control signals to reuse content of the repeated intra-register lane for all lanes of the selected source register.

* * * * *